United States Patent
Akiyama et al.

(10) Patent No.: US 9,234,820 B2
(45) Date of Patent: Jan. 12, 2016

(54) TESTING SYSTEM FOR DRIVETRAIN

(71) Applicant: MEIDENSHA CORPORATION, Tokyo (JP)

(72) Inventors: Takao Akiyama, Tokyo (JP); Yoshimasa Sawada, Tokyo (JP)

(73) Assignee: MEIDENSHA CORPORATION, Tokyo (JP)

( * ) Notice: Subject to any disclaimer, the term of this patent is extended or adjusted under 35 U.S.C. 154(b) by 0 days.

(21) Appl. No.: 14/413,197

(22) PCT Filed: Jun. 25, 2013

(86) PCT No.: PCT/JP2013/067419
§ 371 (c)(1),
(2) Date: Apr. 24, 2015

(87) PCT Pub. No.: WO2014/010409
PCT Pub. Date: Jan. 16, 2014

(65) Prior Publication Data
US 2015/0219529 A1       Aug. 6, 2015

(30) Foreign Application Priority Data
Jul. 9, 2012   (JP) ................................. 2012-153833

(51) Int. Cl.
*G01M 17/007* (2006.01)
*G01M 13/02* (2006.01)
(Continued)

(52) U.S. Cl.
CPC ............... *G01M 17/007* (2013.01); *G01L 3/02* (2013.01); *G01M 13/025* (2013.01); *G01M 15/00* (2013.01); *G01P 3/00* (2013.01); *G01M 15/02* (2013.01)

(58) Field of Classification Search
CPC . G01M 13/025; G01M 15/02; G01M 17/007; G01M 15/00; G01M 17/00; B60C 99/006
USPC ........................................................ 73/115.01
See application file for complete search history.

(56) References Cited

U.S. PATENT DOCUMENTS

| 6,754,615 B1 | 6/2004 | Germann et al. |
| 7,680,639 B2 * | 3/2010 | Schoeggl ............ G01M 17/007 434/66 |

(Continued)

FOREIGN PATENT DOCUMENTS

| JP | 2000-329656 A | 11/2000 |
| JP | 2004-053614 A | 2/2004 |

(Continued)

*Primary Examiner* — Freddie Kirkland, III
(74) *Attorney, Agent, or Firm* — Muncy, Geissler, Olds & Lowe, P.C.

(57) ABSTRACT

Provided is a testing system for a drivetrain, the testing system capable of simulating the slip behavior of a tire. A testing system is provided with: tire speed calculation units; a vehicle speed calculation unit; vehicle driving torque calculation units which calculate vehicle driving torque values; and speed control devices which output command signals such that the deviations between command values and output values from encoders are eliminated, respectively. The tire speed calculation units calculate the tire speed values on the basis of tire driving torque values obtained by subtracting the vehicle driving torque values from output values from shaft torque meters, respectively, and the vehicle speed calculation unit calculates the vehicle speed value on the basis of the vehicle driving torque values.

16 Claims, 16 Drawing Sheets

(51) Int. Cl.
*G01L 3/02* (2006.01)
*G01M 15/00* (2006.01)
*G01P 3/00* (2006.01)
*G01M 15/02* (2006.01)

(56) References Cited

U.S. PATENT DOCUMENTS

| | | | | |
|---|---|---|---|---|
| 8,387,449 B2 * | 3/2013 | Engstrom | ............ | G01M 15/044 73/114.15 |
| 8,590,369 B2 * | 11/2013 | Johnson | ................ | G01M 15/02 73/116.06 |
| 8,631,693 B2 * | 1/2014 | Johnson | ............ | G01M 17/0074 73/116.05 |
| 8,689,618 B2 * | 4/2014 | Engstrom | ......... | G01M 17/0074 73/114.13 |
| 9,116,062 B2 * | 8/2015 | Akiyama | ................... | G01L 3/24 |
| 2004/0059555 A1 | 3/2004 | Schoeggl | | |
| 2012/0166154 A1 | 6/2012 | Johnson et al. | | |
| 2015/0013443 A1 * | 1/2015 | Kanke | ................. | G01M 17/007 73/115.01 |
| 2015/0142341 A1 * | 5/2015 | Akiyama | ................... | G01L 3/24 702/41 |

FOREIGN PATENT DOCUMENTS

| | | |
|---|---|---|
| JP | 2005-061889 A | 3/2005 |
| JP | 2009-074834 A | 4/2009 |

* cited by examiner

TESTING SYSTEM FOR DRIVETRAIN

TECHNICAL FIELD

The present invention relates to a drive-train test system.

BACKGROUND ART

A drive train is a collective term representing a plurality of devices for transmitting energy generated in an engine to driving wheels, and is composed of an engine, a clutch, a transmission, a drive shaft, a propeller shaft, a differential gear, driving wheels, etc. The drive-train test system actually drives the transmission by the engine, and executes electric inertia control on a dynamometer connected to the output shaft, thereby evaluating durability performance or quality of the drive train, while giving appropriate load torque to the output shaft.

Many types of the electric inertia control employed in such a test system can set only a single inertia amount corresponding to a vehicle moment of inertia, as disclosed in, for example, Patent Document 1. This is equivalent to simulating a state where the tires of a real vehicle are always running while gripping on a road surface without slipping. The tires are likely to slip on a slippery road surface such as a snowy or icy surface that actually exists; however, the test system disclosed in Patent Document 1 is difficult to reproduce a state where the tires are slipping on such a road surface.

Patent Document 2 discloses a technique of calculating load torque, on the basis of a dynamic model of a vehicle carrying a drive train. This dynamic model includes a slip model for calculating front and back forces acting on a vehicle, on the basis of a slip ratio of tires, and vertical load acting on the vehicle; and a dynamometer generates load torque in consideration of the slip behavior of the tires.

Patent Document 1: Japanese Unexamined Patent Application, Publication No. 2009-74834

Patent Document 2: Japanese Unexamined Patent Application, Publication No. 2005-61889

DISCLOSURE OF THE INVENTION

Problems to be Solved by the Invention

In the technique disclosed in Patent Document 2, virtual vehicle speed of a vehicle carrying a drive train, and rotational speed of a dynamometer corresponding to rotational speed of a virtual tire, are used as inputs to determine values of various parameters included in the dynamic model; however, this vehicle speed is obtained by multiplying the rotational speed of the dynamometer by a constant such as a tire radius. On the other hand, the tires rotate at high speed while slipping on an actual slippery road surface, in which the frictional force between the rolling tire surface and the road surface is small, and the vehicle speed is not likely to further increase; therefore, the rotational speed of the tire and the vehicle speed should be treated as independent parameters. However, in the technique disclosed in Patent Document 2, the vehicle speed is calculated only in terms of rotational speed of tire; as a result, slipping behavior of a tire cannot be simulated with sufficient accuracy.

An object of the present invention is to provide a drive-train test system, which can simulate slipping behavior of a tire.

Means for Solving the Problems

In order to achieve the above-mentioned object, a first aspect of the present invention provides a test system (for example, test systems 1, 1A, 1B, 1C and 1D to be described later), including: a dynamometer (for example, dynamometers 21 and 22 to be described later) which is connected to an output shaft (for example, an output shaft S1 to be described later) of a workpiece (for example, a transmission T to be described later); an inverter (for example, inverters 31 and 32 to be described later) for supplying electric power to the dynamometer in accordance with a command signal; a shaft torque detector (for example, shaft torque meters 51 and 52 to be described later) for detecting shaft torque acting on the output shaft; a velocity sensor (for example, encoders 41 and 42 to be described later) for detecting rotational speed of the dynamometer; a tire speed calculation unit (for example, tire speed calculation units 611, 611A, 611C, 621 and 621A to be described later) for calculating a tire speed value (Vw1, Vw2) corresponding to rotational speed of a virtual tire connected to the output shaft of the workpiece; a vehicle speed calculation unit (for example, a vehicle speed calculation unit 63 to be described later) for calculating a vehicle speed value (V) corresponding to speed of a virtual vehicle running on the tire as a driving wheel; a vehicle driving torque calculation unit (for example, vehicle driving torque calculation units 612 and 622 to be described later) for calculating a vehicle driving torque value (Fx1, Fx2) generated by friction between the tire and a virtually set road surface, on the basis of a difference between the tire speed value and the vehicle speed value; and a speed control device (for example, speed control devices 613 and 623 to be described later) for using the tire speed value as a command value, and outputting a command signal so as to eliminate a deviation between the command value and an output value of the velocity sensor. The tire speed calculation unit obtains a tire driving torque value contributing to rotation of the tire by subtracting the vehicle driving torque value from an output value of the shaft torque detector, and calculates the tire speed value (Vw1, Vw2), on the basis of the tire driving torque value; and the vehicle speed calculation unit calculates the vehicle speed value (V), on the basis of the vehicle driving torque value.

In the test system according to the first aspect of the present invention, the tire speed calculation unit calculates a tire speed value corresponding to rotational speed of the virtual tire; and the speed control device uses the tire speed value as a command value, and determines a command signal to the inverter, such that the command value coincides with the rotational speed of the dynamometer. Further, in the present invention, an output value of the shaft torque detector is used as an input; the tire speed calculation unit calculates a tire speed value; the vehicle speed calculation unit calculates a virtual vehicle speed value; the vehicle driving torque calculation unit calculates a virtual vehicle driving torque value; and the three independent virtual physical values are calculated through simultaneous equations, thereby calculating a tire speed value serving as a command value to the speed control device. According to the present invention, in particular, the tire speed value and the vehicle speed value are separately treated; and the vehicle driving torque calculation unit calculates a vehicle driving torque value, on the basis of a difference between the tire speed value and the vehicle speed value. As a result, various running states can be easily simulated, ranging from a slipping state of driving, in which a great difference occurs between the tire speed value and the vehicle speed value (for example, a state of driving on a snowy or icy surface), to a gripping state of driving, in which the tire speed value and the vehicle speed value substantially coincide with each other (for example, a state of driving on a dry pavement road).

According to the present invention, the calculation by the tire speed calculation unit, the calculation by the vehicle speed calculation unit, and the calculation by the vehicle driving torque calculation unit are simultaneously performed; a tire speed value as one of the outputs of the three calculation units is used as a command value; and the speed control device incorporates the rotational speed of the dynamometer into the command value. As a result, the rotational speed of the dynamometer can be easily maintained at 0; and a so-called stall test can be easily carried out. The stall test is a test relating to slipping of a workpiece; and more specifically, it is carried out by a power source such as an engine or a dynamometer, which drives an output shaft of a workpiece in a state where a tire is fixed so as not to rotate. In the present invention utilizing the speed control device, for example, a stall test can be easily carried out, in which an output value of the shaft torque detector, which is input into the tire speed calculation unit, is set to 0, so as to artificially create a state of locking a virtual brake; and the tire speed value serving as a command value to the speed control device is forcibly set to 0.

In a second aspect of the present invention, it is preferable that the test system further includes a feedforward input calculation unit (for example, feedforward input calculation units 614 and 624 to be described later) for combining a command signal, which is output from the speed control device, with a signal proportional to a difference between an output value of the shaft torque detector and the vehicle driving torque value, and correcting the command signal.

In the second aspect, when attempting to simulate a state where a tire is slipping, a great difference will rapidly occur between the tire speed value and the vehicle speed value; however, in this case, even if the gain of the speed control devices is constant, an apparent gain of the entire feedback system may significantly fluctuate, and the speed control devices may become unstable. According to the present invention, a signal proportional to a difference between the detection value of the shaft torque meter and the vehicle driving torque value is transmitted as feedforward to an output signal of the speed control device; and as a result, the control can be stabilized.

In a third aspect of the present invention, it is preferable that the tire speed calculation unit uses the tire driving torque value as an input, and calculates the tire speed value by an equation of motion of the tire (for example, Equations (2), (3), (11) and (12) to be described later) characterized by a predetermined moment of inertia of tire ($J_{t1}$, $J_{t2}$); and it is preferable that the vehicle speed calculation unit uses the vehicle driving torque value as an input, and calculates the vehicle speed value by an equation of motion of the vehicle (for example, Equation (1) to be described later) characterized by a predetermined moment of inertia of vehicle ($J_v$).

In the third aspect of the present invention, the virtual tires, and the vehicle running on the tires as the driving wheels, are treated as independent objects; and the tire speed values and the vehicle speed value are calculated on the basis of respective Equations of motion; and as a result, a slip behavior of the tires can be reproduced more precisely.

In a fourth aspect of the present invention, it is preferable that the vehicle driving torque calculation unit calculates a slip ratio of the tire ($\lambda 1$, $\lambda 2$), on the basis of a speed difference between the tire speed value and the vehicle speed value; determines a friction coefficient value ($\mu 1$, $\mu 2$) between the tire and the road surface, by using the slip ratio as an argument, on the basis of a control map selected in accordance with a road surface condition; and calculates the vehicle driving torque value ($F_{x1}$, $F_{x2}$) by multiplying the friction coefficient value by a perpendicular force value ($N_{z1}$, $N_{z2}$) that the tire receives from the road surface.

In the fourth aspect, the vehicle driving torque calculation unit calculates the vehicle driving torque value, by calculating a slip ratio on the basis of a speed difference between the tire speed value and the vehicle speed value; using the calculated slip ratio as an argument to retrieve a control map; determining a value as a coefficient of friction between the tire and the road surface; and multiplying the determined value by perpendicular force value. In the present invention, in particular, when calculating the friction coefficient value, the control map is utilized, which is selected in accordance with the road surface state; and as a result, various road surface states can be easily simulated.

In a fifth aspect of the present invention, it is preferable that the test system (for example, test systems 1C and 1D to be described later) further includes a braking torque calculation unit (for example, a braking torque calculation unit 616C to be described later) for calculating a braking torque value, which is generated by operating a virtual braking device provided to the output shaft of the workpiece; in which the tire speed calculation unit (for example, a first tire speed calculation unit 611C to be described later) obtains a tire driving torque value contributing to rotation of the tire by subtracting the vehicle driving torque value and the braking torque value (DB1) from an output value of the shaft torque detector, and calculates the tire speed value, on the basis of the tire driving torque value; and the braking torque calculation unit uses a predetermined braking torque command value (DB1_cmd) as an upper limit, and calculates the braking torque value (DB1) so as to be smaller than the upper limit, such that the tire speed value becomes 0.

According to the fifth aspect of the present invention, the braking torque calculation unit calculates a braking torque value, which is generated by operating a virtual braking device; and the tire speed calculation unit obtains a tire speed value, on the basis of a value obtained by subtracting the vehicle driving torque value and the breaking torque value from an output value of the shaft torque detector. As a result, even if a mechanical brake is not provided to the workpiece, behavior when operating a brake can be reproduced. In the present invention, the braking torque calculation unit does not directly input a predetermined braking torque command value into the tire speed calculation unit, but uses this as an upper limit. That is to say, the braking torque calculation unit uses the braking torque command value as an upper limit, and calculates the braking torque value so as to be smaller than the upper limit, such that the tire speed value calculated by the tire speed calculation unit becomes 0. As a result, the braking torque command value is increased or decreased, thereby making it possible to precisely reproduce virtual vehicle behavior from running until stopping, for cases where the brake is operated strongly or weakly. In other words, it is possible to reproduce behavior of a running vehicle, such as behavior when the vehicle is stopped in a short time by strongly operating the brake, and behavior when the vehicle is stopped in a long time by weakly operating the brake.

In a sixth aspect of the present invention, it is preferable that the test system (for example, a test system 1D to be described later) further includes a rate-of-change limitation unit (for example, a first rate-of-change limitation unit 619D to be described later) for limiting the predetermined braking torque command value to or below a predetermined rate of change; in which the braking torque calculation unit uses the predetermined braking torque command value, which is limited by the rate-of-change limitation unit, as an upper limit, and calculates the braking torque value so as to be smaller than the upper limit, such that the tire speed value becomes 0.

According to the sixth aspect of the present invention, the rate-of-change limitation unit limits the braking torque command value to or below a predetermined rate of change; and the braking torque calculation unit uses the limited braking torque command value as an upper limit, and calculates the braking torque value so as to be smaller than the upper limit, such that the tire speed value becomes 0. As a result, the rate of change is increased or decreased, thereby making it possible to precisely reproduce virtual vehicle behavior from running until stopping, for cases where the braking device is operated rapidly or slowly. In other words, it is also possible to reproduce behavior of a running vehicle, in which the wheels are locked by rapidly and strongly operating the brake.

In a seventh aspect of the present invention, it is preferable that the test system further includes a shaft torque input selector (for example, shaft torque input selectors 615 and 625 to be described later) for selectively switching an input to the tire speed calculation unit, between an output value of the shaft torque detector and a value 0.

In the seventh aspect of the present invention, the shaft torque input selector switches an input to the tire speed calculation unit, between an output value of the shaft torque detector and a value 0; and as a result, a state of locking a virtual brake can be artificially created, and a stall test can be easily performed.

In an eighth aspect of the present invention, it is preferable that the test system further includes: a braking device (for example, braking devices 71A and 72A to be described later) for decelerating rotation of the output shaft of the workpiece; and a decelerating torque calculation unit (for example, decelerating torque calculation units 615A and 625A to be described later) for calculating a decelerating torque value of the output shaft, on the basis of an output value of the shaft torque detector, an output value of the velocity sensor, and a command signal value to the inverter; in which the tire speed calculation unit obtains the tire driving torque value by subtracting the vehicle driving torque value and the decelerating torque value from an output value of the shaft torque detector.

In the eighth aspect of the present invention, the test system further includes a braking device for decelerating rotation of the output shaft of the workpiece; a decelerating torque value, which is generated by operating the braking device, is estimated on the basis of an output value of the shaft torque detector, an output value of the velocity sensor, and a command signal value of the inverter; and a tire driving torque value is obtained by subtracting the decelerating torque value of the braking device from an output value of the shaft torque detector. As a result, behavior when operating the braking devices can be reproduced; therefore, the test reproducibility can be further improved.

In order to achieve the above-mentioned object, a ninth aspect of the present invention provides a drive-train test system, including: a first dynamometer and a second dynamometer, which are connected to respective end sides of an output shaft of a workpiece; a first inverter for supplying electric power to the first dynamometer in accordance with a first command signal, and a second inverter for supplying electric power to the second dynamometer in accordance with a second command signal; a first shaft torque detector for detecting shaft torque acting on the first dynamometer side of the output shaft, and a second shaft torque detector for detecting shaft torque acting on the second dynamometer side of the output shaft; a first velocity sensor for detecting rotational speed of the first dynamometer, and a second velocity sensor for detecting rotational speed of the second dynamometer; a first tire speed calculation unit for calculating a first tire speed value corresponding to rotational speed of a first virtual tire connected to the first dynamometer side of the output shaft, and a second tire speed calculation unit for calculating a second tire speed value corresponding to rotational speed of a second virtual tire connected to the second dynamometer side of the output shaft; a vehicle speed calculation unit for calculating a vehicle speed value corresponding to speed of a virtual vehicle running on the first and second tires as driving wheels; a first vehicle driving torque calculation unit for calculating a first vehicle driving torque value generated by a friction force between the first tire and a virtually set first road surface, on the basis of a difference between the first tire speed value and the vehicle speed value; a second vehicle driving torque calculation unit for calculating a second vehicle driving torque value generated by a friction force between the second tire and a virtually set second road surface, on the basis of a difference between the second tire speed value and the vehicle speed value; a first speed control device for using the first tire speed value as a first command value, and outputting a first command signal so as to eliminate a deviation between the first command value and an output value of the first velocity sensor; and a second speed control device for using the second tire speed value as a second command value, and outputting a second command signal so as to eliminate a deviation between the second command value and an output value of the second velocity sensor. The first tire speed calculation unit obtains a first tire driving torque value contributing to rotation of the first tire by subtracting the first vehicle driving torque value from an output value of the first shaft torque detector, or from an average value of output values of the first and second shaft torque detectors, and calculates the first tire speed value, on the basis of the first tire driving torque value; the second tire speed calculation unit obtains a second tire driving torque value contributing to rotation of the second tire by subtracting the second vehicle driving torque value from an output value of the second shaft torque detector, or from an average value of output values of the first and second shaft torque detectors, and calculates the second tire speed value, on the basis of the second tire driving torque value; and the vehicle speed calculation unit calculates the vehicle speed value, on the basis of a total value of the first vehicle driving torque value and the second vehicle driving torque value.

In the ninth aspect of the present invention, the dynamometers, the inverters, the shaft torque detectors, the velocity sensors, the tire speed calculation units, the vehicle driving torque calculation units, and the speed control devices are provided in pairs correspondingly to the virtual tires connected to the two end sides of the output shaft of the workpiece. The vehicle speed calculation unit, which is common to the wheels, calculates the vehicle speed value on the basis of the first and the second vehicle driving torque values respectively calculated by the first and vehicle driving torque calculation units. As a result, various running states of the vehicle running with the two driving wheels can be easily simulated.

In a tenth aspect of the present invention, it is preferable that the first vehicle driving torque calculation unit calculates a first slip ratio of the first tire, on the basis of a speed difference between the first tire speed value and the vehicle speed value; determines a first friction coefficient value between the first tire and the first road surface, by using the first slip ratio as an argument, on the basis of a first control map selected in accordance with a first road surface condition; and calculates the first vehicle driving torque value by multiplying the first friction coefficient value by a first perpendicular force value that the first tire receives from the first road surface; and the second vehicle driving torque calculation unit calculates a second slip ratio of the second tire, on the basis of a speed difference between the second tire speed value and the vehicle speed value; determines a second friction coefficient value between the second tire and the second road surface, by using the second slip ratio as an argument, on the basis of a second control map selected in accordance with a second road surface condition; and calculates the second vehicle driving torque value by multiplying the second friction coefficient value by a second perpendicular force value that the second tire receives from the second road surface.

In the tenth aspect of the present invention, the first vehicle driving torque calculation unit and the second vehicle driving torque calculation unit are separately provided correspondingly to the virtual tires connected to the two end sides of the output shaft of the workpiece, and determine the respective friction coefficient values by independently utilizing the first control map and the second control map; and as a result, the road surface states can be independently set for the tires. That is to say, for example, it is also possible to set such that the first tire is on a road surface on which it is easy to slip, and the second tire is on a road surface on which it is hard to slip. As a result, the reproducibility of the test is further improved.

Effects of the Invention

According to the present invention, it is possible to easily simulate various running states ranging from a slipping state of driving, to a gripping state of driving. A stall test can also be easily carried out.

Figure 1:
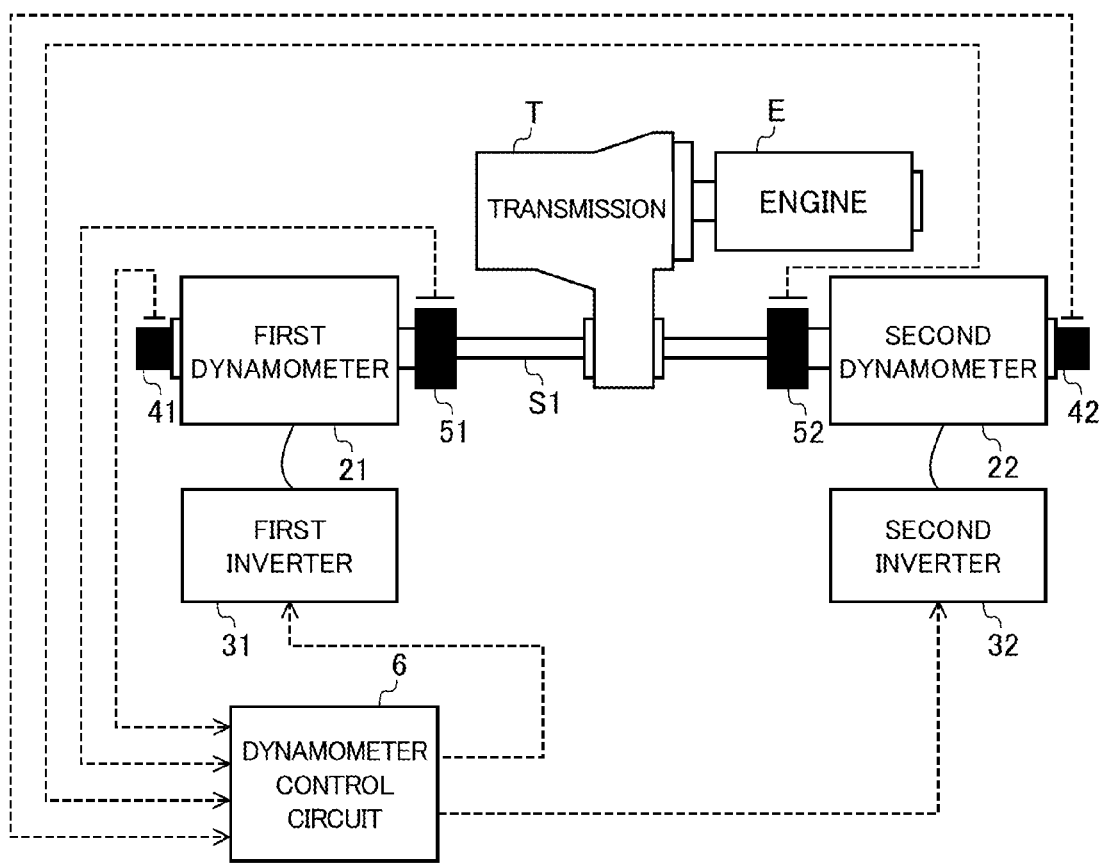
FIG. 1 is a schematic diagram showing a configuration of a drive-train test system according to a first embodiment of the present invention.

EXPLANATION OF REFERENCE NUMERALS 1, 1A, 1B, 1C, 1D . . . test system
T . . . transmission (workpiece)
E . . . engine
21, 22 . . . first, second dynamometer
31, 32 . . . first, second inverter
41, 42 . . . first, second encoder (first, second velocity sensor)
51, 52 . . . first shaft torque meter (first, second shaft torque detector)
6, 6A, 6B, 6C, 6D dynamometer control circuit
611, 611A, 611B, 612C . . . first tire speed calculation unit
616C . . . first braking torque calculation unit (braking torque calculation unit)
617C . . . first brake ASR
618C . . . braking torque limiter
619D . . . first rate-of-change limitation unit (rate-of-change limitation unit)
621, 621A, 621B . . . second tire speed calculation unit
612, 622 . . . first, second vehicle driving torque calculation unit
613, 623 . . . first, second speed control device
614, 624 . . . first, second feedforward input calculation unit
615, 625 . . . first, second shaft torque input selector
615A, 625A . . . first, second decelerating torque calculation unit
63 . . . vehicle speed calculation unit
64B . . . shaft torque average value calculation unit
71A, 72A . . . first, second braking device (braking device)

PREFERRED MODE FOR CARRYING OUT THE INVENTION

First Embodiment

A drive-train test system 1 according to a first embodiment of the present invention is described with reference to the accompanying drawings.

FIG. 1 is a schematic diagram showing a configuration of the test system 1 of the present embodiment. FIG. 1 shows an example of the test system 1, of which test pieces are a transmission T of an FF-drive vehicle, and an engine E connected to an input shaft thereof; however, the present invention is not limited thereto. The test piece may be a transmission and an engine of an FR-drive vehicle. A power source connected to the input shaft of the transmission T may be a dynamometer in place of the real engine E.

The test system 1 is provided with: a first dynamometer 21 and a second dynamometer 22, which are connected to two end sides of an output shaft S1 of the transmission T; a first inverter 31 and a second inverter 32 for supplying electric power to the dynamometers 21 and 22; a first encoder 41 and a second encoder 42 for detecting rotational speed of the dynamometers 21 and 22; a first shaft torque meter 51 and a second shaft torque meter 52 for detecting shaft torque of the output shaft S1; a dynamometer control circuit 6 for controlling the dynamometers 21 and 22 on the basis of output signals, etc. from the encoders 41 and 42 and the shaft torque meters 51 and 52; and an engine control unit (not shown) for controlling the engine E. In the present test system, the transmission T is driven by the engine E; and the dynamometer control circuit 6 performs electric inertia control on the dynamometers 21 and 22 connected to the two end sides of the output shaft S1; thereby evaluating durability performance, quality, etc. of the transmission T, while giving appropriate load torque to the output shaft S1.

The first inverter 31 supplies electric power to the first dynamometer 21, in accordance with a first torque current command signal that is output from dynamometer control circuit 6. The second inverter 32 supplies electric power to the second dynamometer 22, in accordance with a second torque current command signal that is output from dynamometer control circuit 6.

The first encoder 41 detects rotational speed of the first dynamometer 21, and transmits a signal substantially proportional to the detection value to the dynamometer control circuit 6. The second encoder 42 detects rotational speed of the second dynamometer 22, and transmits a signal substantially proportional to the detection value to the dynamometer control circuit 6. The first shaft torque meter 51 detects shaft torque acting on the first dynamometer 21 side of the output shaft S1, on the basis of, for example, a strain amount in an axial torsion direction, and transmits a signal substantially proportional to the detection value to the dynamometer control circuit 6. The second shaft torque meter 52 detects shaft torque acting on the second dynamometer 22 side of the output shaft S1, on the basis of, for example, a strain amount in an axial torsion direction, and transmits a signal substantially proportional to the detection value to the dynamometer control circuit 6.

Figure 2:
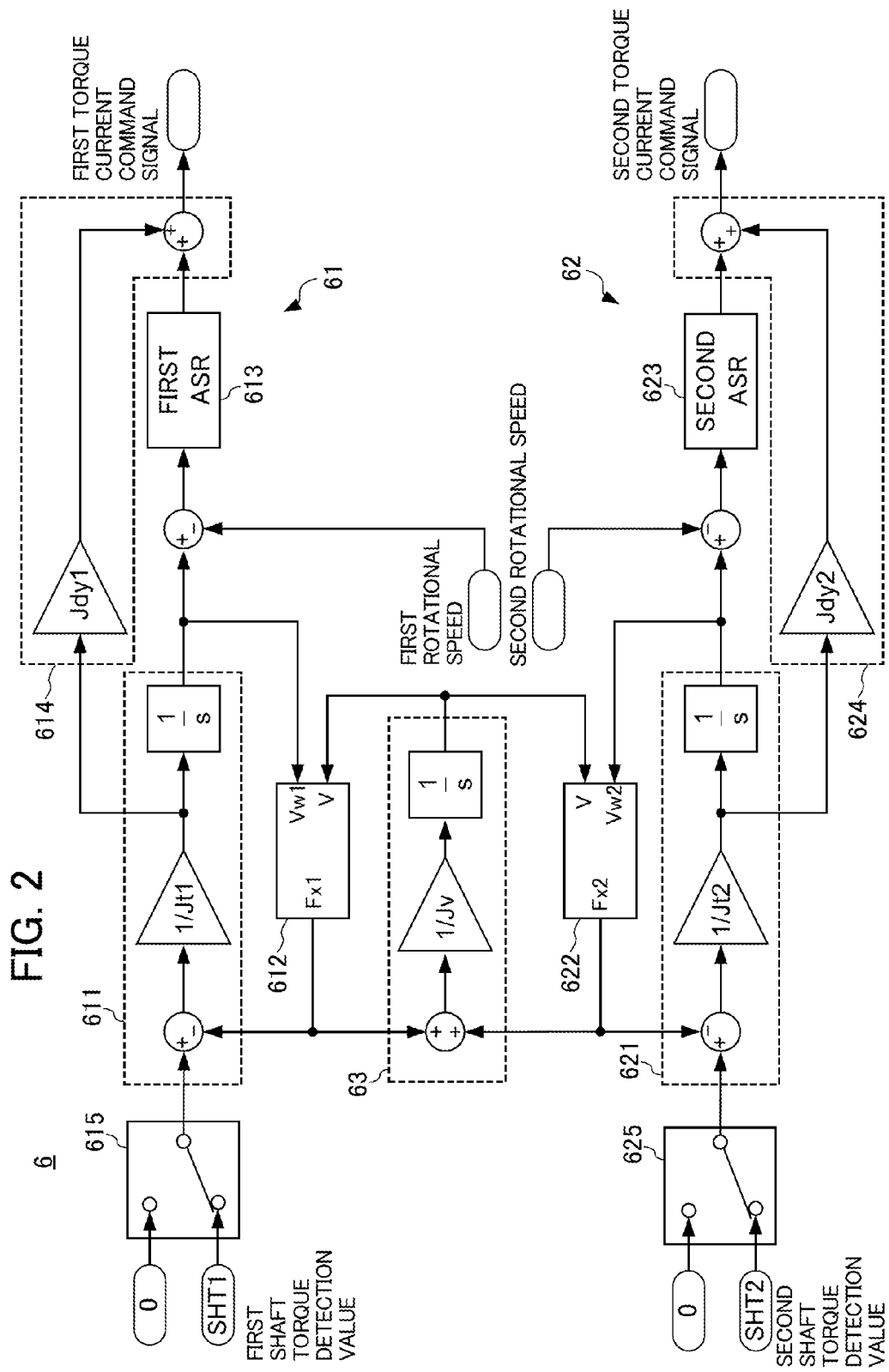
FIG. 2 is a block diagram showing a configuration of a dynamometer control circuit.

FIG. 2 is a block diagram showing a configuration of the dynamometer control circuit 6.

As shown in FIG. 2, the dynamometer control circuit 6 is divided into: a first control circuit 61 for outputting a first torque current command signal on the basis of an output signal from the first shaft torque meter 51 and the first encoder 41; a second control circuit 62 for outputting a second torque current command signal on the basis of an output signal from the second shaft torque meter 52 and the second encoder 42; and a vehicle speed calculation unit 63 for calculating speed of a virtual vehicle carrying the engine E and the transmission T.

The first control circuit 61 is provided with a first tire speed calculation unit 611, a first vehicle driving torque calculation unit 612, a first speed control device 613, a first feedforward input calculation unit 614, and a first shaft torque input selector 615.

The second control circuit 62 is provided with a second tire speed calculation unit 621, a second vehicle driving torque calculation unit 622, a second speed control device 623, a second feedforward input calculation unit 624, and a second shaft torque input selector 625.

The vehicle speed calculation unit 63 receives inputs of: a first vehicle driving torque value Fx1 (to be described later) corresponding to a vehicle driving force generated by a frictional force between a first virtual tire and a first virtual road surface; and a second vehicle driving torque value Fx2 (to be described later) corresponding to a vehicle driving force generated by a frictional force between a second virtual tire and a second virtual road surface; and calculates a vehicle speed value V corresponding to vehicle speed by a vehicle equation of motion (see the following Equation (1)) characterized by the moment of inertia Jv of the virtual vehicle running on the first and second tires as driving wheels.

$$Fx1+Fx2=Jv \cdot dV/dt \qquad (1)$$

More specifically, the vehicle speed calculation unit 63 calculates a vehicle speed value V, by adding up the first vehicle driving torque value Fx1 calculated by the first vehicle driving torque calculation unit 612, and the second vehicle driving torque value Fx2 calculated by the second vehicle driving torque calculation unit 622; multiplying the added value by a reciprocal number of the vehicle moment of inertia Jv; and performing an integration operation thereon.

The first shaft torque input selector 615 selectively switches the input to the first tire speed calculation unit 611, between a detection value SHT1 of the first shaft torque meter and a value 0. As for the input to the first tire speed calculation unit 611, the first shaft torque input selector 615 ordinarily selects the first shaft torque meter detection value SHT1, and selects the value 0 when a stall test (to be described later) is performed.

The first tire speed calculation unit 611 uses the first shaft torque meter detection value SHT1 and the first vehicle driving torque value Fx1 as inputs, and calculates a first tire speed value Vw1 corresponding to the rotational speed of the first tire, by an equation of motion of the first tire (see the following Equation (2)) characterized by the moment of inertia Jt1 of the first tire.

$$SHT1-Fx1=Jt1 \cdot dVw1/dt \qquad (2)$$

More specifically, the first tire speed calculation unit 611 calculates the first tire speed value Vw1 by: obtaining a value by subtracting the first vehicle driving torque value Fx1 from the first shaft torque detection value SHT1; defining the obtained value as a first tire driving torque value contributing to the rotation of the first tire, which is then multiplied by the reciprocal number of the moment of inertia Jt1 of the first tire; and performing an integration operation thereon.

The second shaft torque input selector 625 selectively switches the input to the second tire speed calculation unit 621, between a detection value SHT2 of the second shaft torque meter and a value 0. As for the input to the second tire speed calculation unit 621, the second shaft torque input selector 625 ordinarily selects the second shaft torque meter detection value SHT2, and selects the value 0 when a stall test (to be described later) is performed.

The second tire speed calculation unit 621 uses the second shaft torque meter detection value SHT2 and the second vehicle driving torque value Fx2 as inputs, and calculates a second tire speed value Vw2 corresponding to the rotational speed of the second tire, by an equation of motion of the second tire (see the following Equation (3)) characterized by the moment of inertia Jt2 of the second tire. Specific steps of calculating the second tire speed value Vw2 are similar to the steps of calculating the first tire speed value Vw1; therefore, detailed descriptions thereof are omitted herein.

$$SHT2-Fx2=Jt2 \cdot dVw2/dt \qquad (3)$$

The first vehicle driving torque calculation unit 612 calculates the first vehicle driving torque value Fx1 corresponding to the vehicle driving force generated by the frictional force between the first tire and the first road surface being virtually set, on the basis of a difference between the first tire speed value Vw1 and the vehicle speed value V. The steps thereof are specifically described below.

Figure 3:
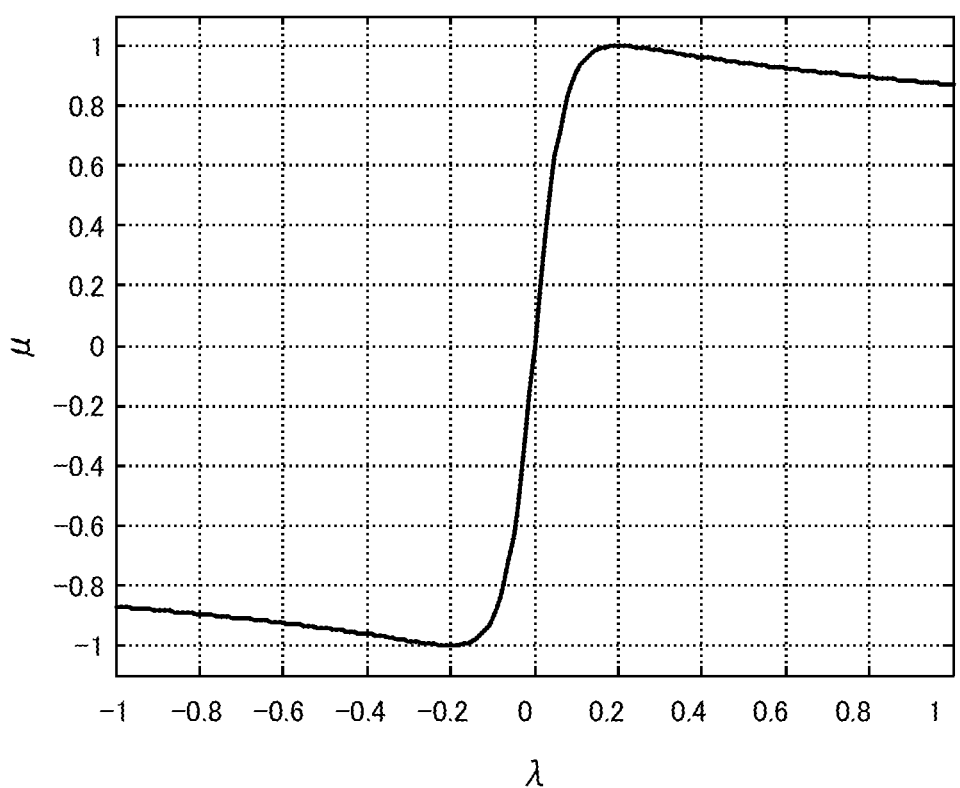
FIG. 3 is a diagram showing an example of a control map for determining a friction coefficient value between a tire and a road surface.

First of all, the vehicle driving torque calculation unit 612 calculates a first slip ratio 21 of the first tire on the first road surface by the following Equation (4), on the basis of a speed difference (Vw1−V) as well as a larger one of the speed values Vw1 and V. Next, the first vehicle driving torque calculation unit 612 uses the calculated first slip ratio λ1 as an argument, and determines a first friction coefficient value μ1 between the first tire and the first road surface (see the following Equation (5)), on the basis of a control map f1 as shown in FIG. 3. The control map for determining the friction coefficient value can be appropriately selected depending on the state of the first road surface (snowy surface, dried road surface, etc.). Next, the first vehicle driving torque calculation unit 612 calculates the first vehicle driving torque value Fx1 by multiplying the first friction coefficient value μ1 by a first perpendicular force value Nz1 that the first tire receives from the first road surface (see the following Equation (6)). A predetermined constant or a value estimated from the vehicle speed value V or the like is used as the first perpendicular force value Nz1.

$$\lambda 1 = (Vw1 - V)/\max(Vw1, V) \quad (4)$$

$$\mu 1 = f1(\lambda 1) \quad (5)$$

$$Fx1 = Nz1 \cdot \mu 1 \quad (6)$$

The second vehicle driving torque calculation unit 622 uses the second tire speed value Vw2 and the vehicle speed value V as inputs, and calculates the second vehicle driving torque value Fx2 corresponding to the vehicle driving force generated by the frictional force between the second tire and the second road surface, by the following Equations (7) to (9). Specific steps of calculating the second vehicle driving torque value Fx2 are similar to the steps of calculating the first vehicle driving torque value Fx1; therefore, detailed descriptions thereof are omitted herein.

$$\lambda 2 = (Vw2 - V)/\max(Vw2, V) \quad (7)$$

$$\mu 2 = f2(\lambda 2) \quad (8)$$

$$Fx2 = Nz2 \cdot \mu 2 \quad (9)$$

As described above, the first control circuit 61 and the second control circuit 62 calculate the vehicle speed value V, the first tire speed value Vw1, and the second tire speed value Vw2, by virtually setting the first tire and the second tire connected to the two end sides of the output shaft of the transmission, as well as the vehicle running with these tires as the driving wheels on the first road surface and the second road surface, respectively; assuming that these objects have the independent moments of inertia Jt1, Jt2 and Jv; and solving the Equations (1) to (9) of motion as simultaneous equations.

The first speed control device (first ASR) 613 uses the first tire speed value Vw1 as the first command value, and outputs the first torque command signal such that the detection value of the first encoder serves as the first command value. The second speed control device (second ASR) 623 uses the second tire speed value Vw2 as the second command value, and outputs the second torque command signal such that the detection value of the second encoder serves as the second command value.

When a slip occurs, more specifically when a great difference occurs between the first shaft torque detection value SHT1 and the first vehicle driving torque value Fx1, in order to compensate for the possibility for the operation of the first speed control device 613 to be unstable, the first feedforward input calculation unit 614 combines a signal proportional to the difference between the first shaft torque detection value SHT1 and the first vehicle driving torque value Fx1, with the first torque command signal, which is output from the first speed control device 613, thereby correcting the first torque command signal. More specifically, the first feedforward input calculation unit 614 obtains a signal by multiplying the difference between the first shaft torque detection value SHT1 and the first vehicle driving torque value Fx1 by a reciprocal number of the moment of inertia Jt1 of the first tire, multiplies the obtained signal by the moment of inertia Jdy1 of the first dynamometer, and combines the result with the first torque command signal, which is output from the first speed control device 613.

The second feedforward input calculation unit 624 corrects the second torque command signal that is output from the second speed control device 623, by the steps similar to those of the first feedforward input calculation unit 614. The steps of correcting the second torque command signal are similar to the steps of correcting the first torque command signal; therefore, detailed descriptions thereof are omitted herein.

Figure 4:
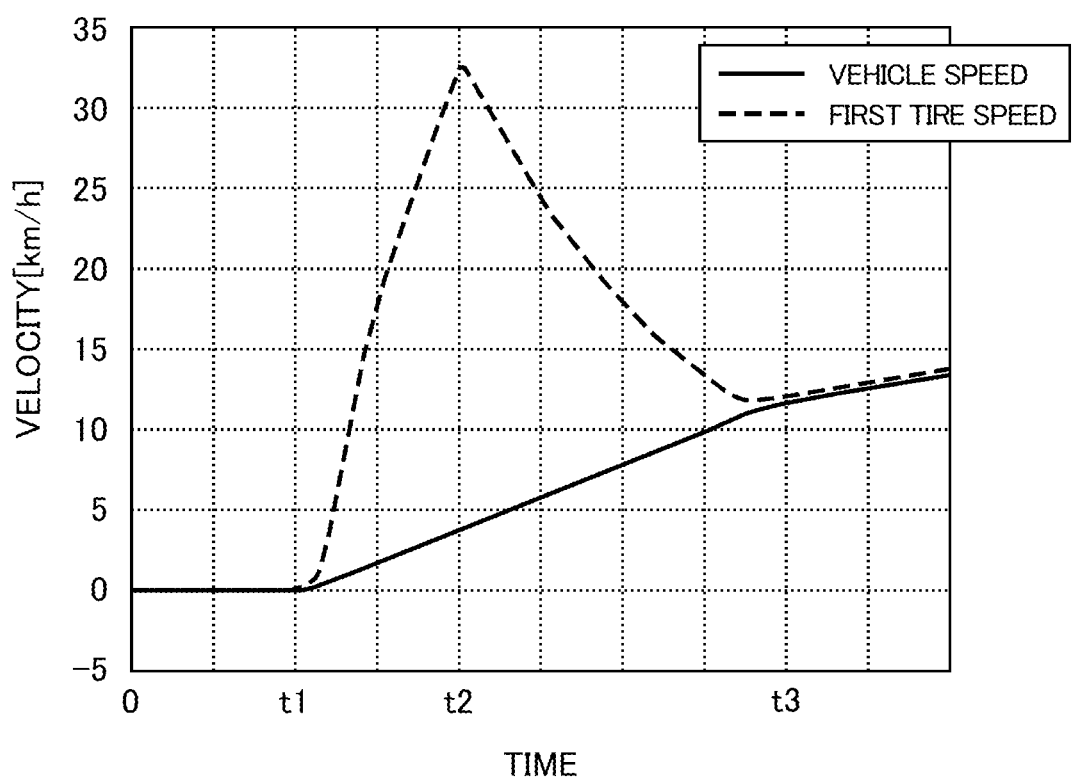
FIG. 4 is a diagram showing an example of how a vehicle speed value and a tire speed value change.

FIG. 4 is a diagram showing an example of how the vehicle speed value V and the first tire speed value Vw1 change. FIG. 4 shows an example of how the vehicle speed value V and the first tire speed value Vw1 change over time, when the vehicle is stopped at first; the accelerator pedal is deeply pressed to suddenly accelerate the engine E at time t1; and subsequently, the pressing of the accelerator pedal is relaxed at time t2.

As shown in FIG. 4, when the engine E is suddenly accelerated at time t1, the tire speed value remarkably rises in comparison with the vehicle speed value. The tire speed value decreases when the pressing of the accelerator pedal is relaxed at time t2; and the tire speed value becomes approximately equal to the vehicle speed value at time t3. According to the test system of the present embodiment, the vehicle speed value and the tire speed value are separately treated, thereby making it possible to easily simulate the running states ranging from a slipping state of driving to a gripping state of driving.

According to the test system of the present embodiment, the following effects (A) to (F) are achieved.

(A) The test system 1 separately treats the tire speed value Vw1, Vw2 and the vehicle speed value V; and the vehicle driving torque calculation units 612 and 622 calculate the vehicle driving torque values Fx and Fx2 on the basis of difference between the tire speed value Vw1, Vw2 and the vehicle speed value V; as a result, various running states can be easily simulated, ranging from a slipping state of driving, in which a great difference occurs in the tire speed values Vw1, Vw2 and the vehicle speed value V, to a gripping state of driving, in which the tire speed value and the vehicle speed value substantially coincide with each other. The test system 1 uses the tire speed values Vw1 and Vw2 as command values; and the speed control devices 613 and 623 incorporate the rotational speed of the dynamometers 21 and 22 into the command values; as a result, the rotational speed of the dynamometers 21 and 22 can be easily maintained at 0; and therefore, a stall test can also be easily performed. More specifically, for example, the inputs into the first and second tire speed calculation units 611 and 621 are respectively switched to a value 0 by the first and second shaft torque input selectors 615 and 625; as a result, the shaft torque meter output values SHT1 and SHT2, which are input into the tire speed calculation units 611 and 621, are set to 0, artificially creating a state where the virtual brake is locked; and the command value to be input into the speed control devices 613 and 623 is forcibly set to 0; as a result, a stall test can be easily performed.

(B) When attempting to simulate a state where a tire is slipping, a great difference will rapidly occur between the tire speed values Vw1, Vw2 and the vehicle speed value V; however, in this case, even if the gain of the speed control devices 613 and 623 is constant, an apparent gain of the entire feedback system may significantly fluctuate, and the speed control devices 613 and 623 may become unstable. According to the present invention, a signal proportional to a difference between the detection values SHT1, SHT2 of the shaft torque meters 51, 52 and the vehicle driving torque values Fx1, Fx2 is transmitted as feedforward to an output signal of the speed control devices 613 and 623; and as a result, the control can be stabilized.

(C) With the test system 1, the first and second virtual tires, and the vehicle running on the tires as the driving wheels, are treated as independent objects; and the tire speed values Vw1, Vw2 and the vehicle speed value V are calculated on the basis of Equations of motion (1) to (9); and as a result, a slip behavior of the tires can be reproduced more precisely.

(D) The vehicle driving torque calculation units 612 and 622 calculate the vehicle driving torque values Fx1 and Fx2, by calculating slip ratios λ1 and λ2 on the basis of a speed difference between the tire speed values Vw1, Vw2 and the vehicle speed value V; using the calculated slip ratios as arguments to retrieve control maps f1 and f2; determining values μ1 and μ2 as coefficients of friction between the tire and the road surface; and multiplying the determined values by perpendicular force values Nz1 and Nz2. Here, in particular, when calculating the friction coefficient values μ1 and μ2, the control maps f1 and f2 are utilized, which are selected in accordance with the road surface state; and as a result, various road surface states can be easily simulated.

(E) With the test system 1, the vehicle speed calculation unit 63, which is common to the wheels, calculates the vehicle speed value V on the basis of the vehicle driving torque values Fx1 and Fx2 calculated by the vehicle driving torque calculation units 612 and 622. As a result, various running states of the vehicle running with the two driving wheels can be easily simulated.

(F) With the test system 1, the first vehicle driving torque calculation unit 612 and the second vehicle driving torque calculation unit 622 determine the respective friction coefficient values μ1 and μ2 by independently utilizing the first control map f1 and the second control map f2; and as a result, the road surface states can be independently set for the tires. That is to say, for example, it is also possible to set such that the first tire is on a road surface on which it is easy to slip, and the second tire is on a road surface on which it is hard to slip. As a result, the reproducibility of the test is further improved.

Second Embodiment

A drive-train test system 1A according to a second embodiment of the present invention is described with reference to the accompanying drawings.

Figure 5:
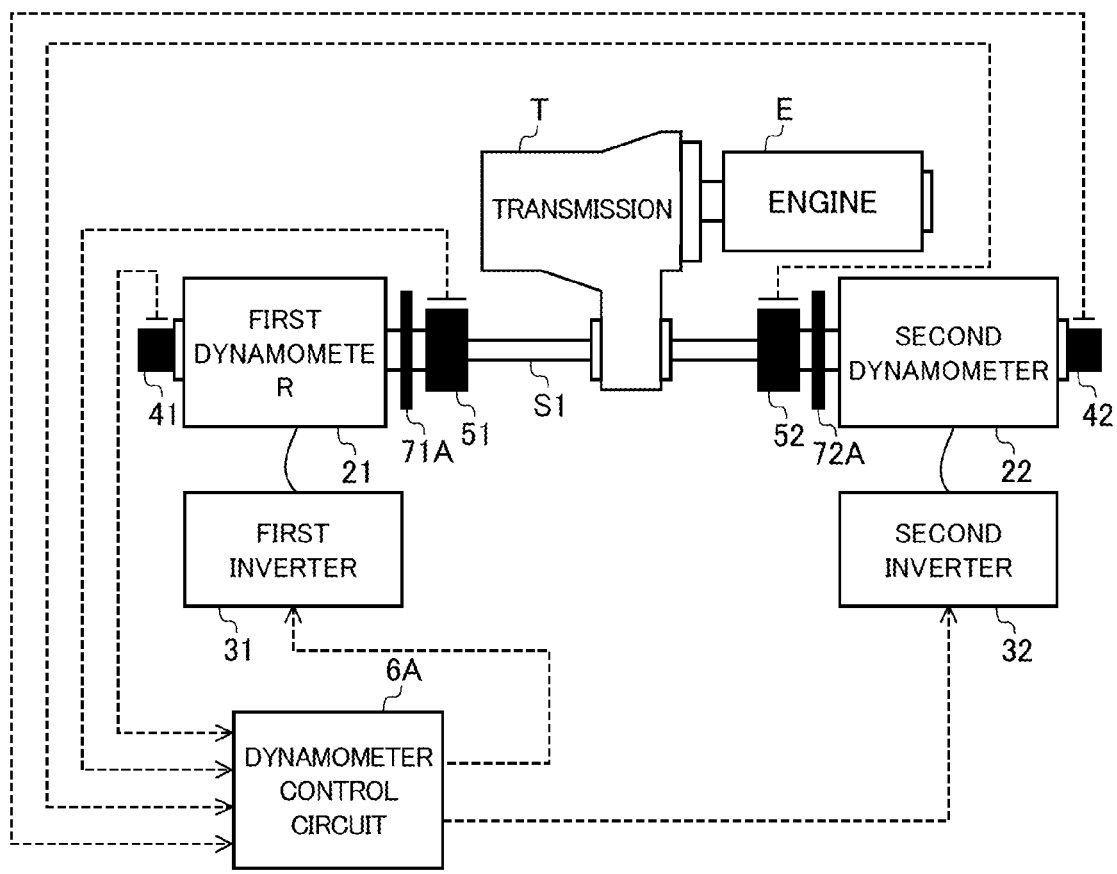
FIG. 5 is a schematic diagram showing a configuration of a drive-train test system according to a second embodiment of the present invention.

FIG. 5 is a schematic diagram showing a configuration of the test system 1A of the present embodiment. In the following descriptions of the test system 1A, the same configurations as those of the test system 1 of the first embodiment are assigned with the same reference numerals; and detailed descriptions thereof are omitted herein. The test system 1A is further provided with a first braking device 71A and a second braking device 72A for decelerating the rotation of the output shaft S1 of the transmission T, which is different from the test system 1 of the first embodiment; and a configuration of a dynamometer control circuit 6A is also different therefrom.

With the first braking device 71A, a brake caliper (not shown) pinches a brake rotor provided to the first dynamometer 21 side of the output shaft S1 of the transmission T, thereby decelerating the rotation of the output shaft S1. With the second braking device 72A, a brake caliper (not shown) pinches a brake rotor provided to the second dynamometer 22 side of the output shaft S1 of the transmission T, thereby decelerating the rotation of the output shaft S1.

Figure 6:
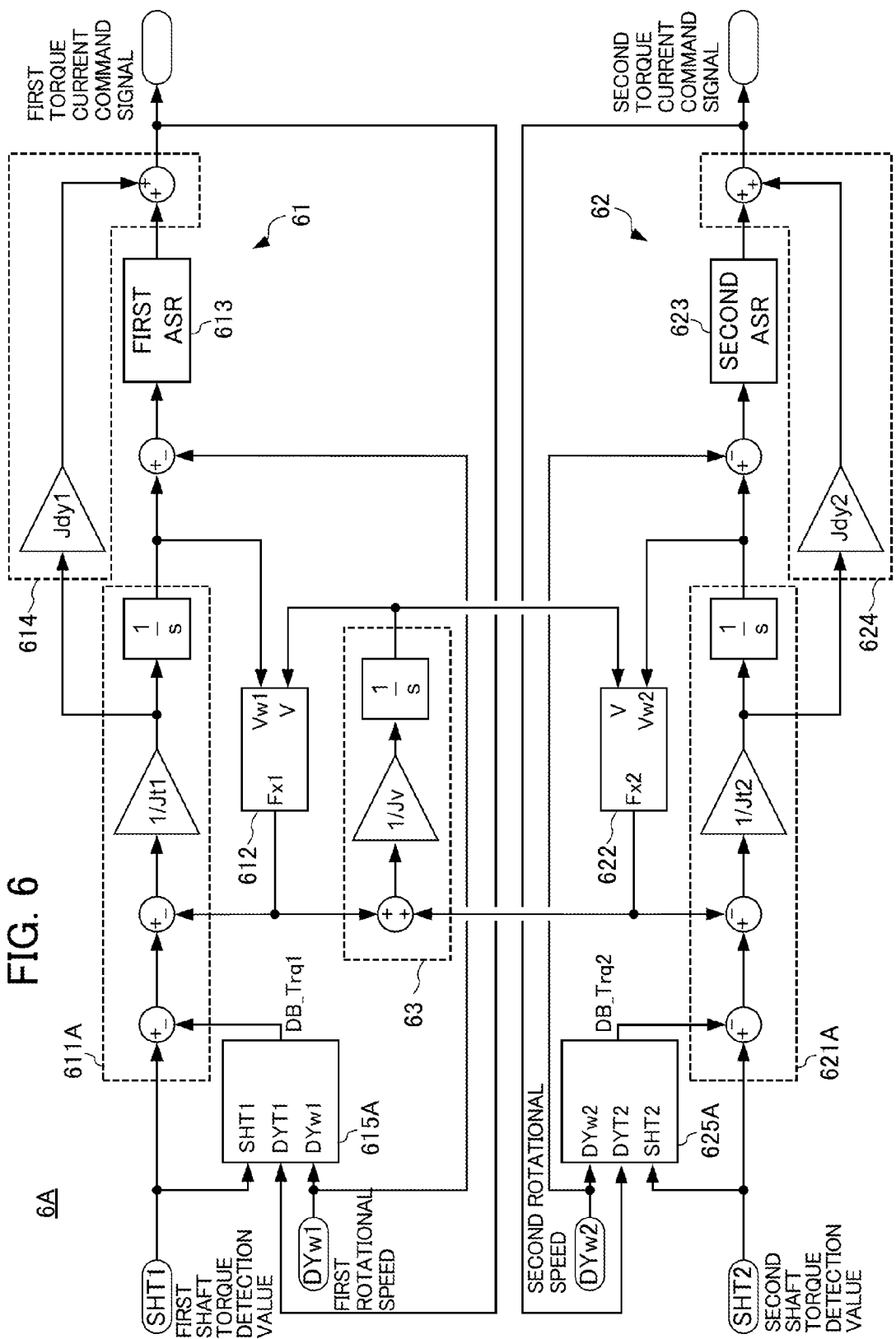
FIG. 6 is a block diagram showing a configuration of a dynamometer control circuit.

FIG. 6 is a block diagram showing a configuration of a dynamometer control circuit 6A.

The dynamometer control circuit 6A is further provided with a first decelerating torque calculation unit 615A and a second decelerating torque calculation unit 625A, which is different from the test system 1 of the first embodiment; and a configuration of tire speed calculation units 611A and 621A is also different therefrom.

Figure 7:
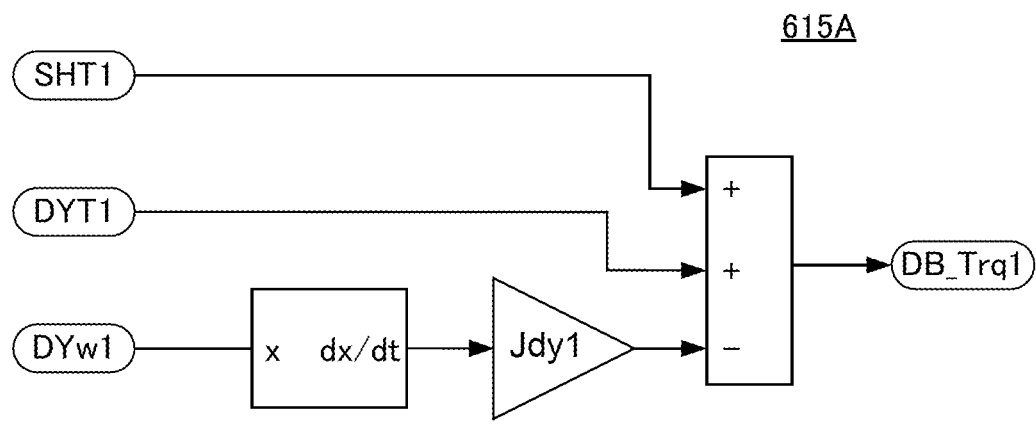
FIG. 7 is a block diagram showing calculation steps for a decelerating torque calculation unit.

FIG. 7 is a block diagram showing calculation steps for the first decelerating torque calculation unit 615A.

The first decelerating torque calculation unit 615A calculates a first decelerating torque value DB_Trq1 for the first braking device provided to the first dynamometer side of the output shaft S1, on the basis of the first shaft torque meter output value SHT1, a first encoder output value DYw1, and a first torque command signal value DYT1. More specifically, the first decelerating torque calculation unit 615A uses the output values SHT1, DYw1 and DYT1 as inputs, and calculates the first decelerating torque value DB_Trq1, on the basis of an equation of motion of the first dynamometer having the moment of inertia Jdy1 (see the following Equation (10)).

$$Jdy1 \cdot dDYw1/dt = SHT1 + DYT1 - DB\_Trq1 \quad (10)$$

Referring back to FIG. 6, the first tire speed calculation unit 611A obtains a tire driving torque value by subtracting the first vehicle driving torque value Fx1 and the first decelerating torque value DB_Trq1 from the first shaft torque meter detection value SHT1; and uses the tire driving torque value as an input to calculate the first tire speed value Vw1 by an equation of motion of the first tire shown in the following Equation (11).

$$SHT1 - DB\_Trq1 - Fx1 = Jt1 \cdot dVw1/dt \quad (11)$$

The second decelerating torque calculation unit 625A calculates a second decelerating torque value DB_Trq2, on the basis of the second shaft torque meter output value SHT2, a second encoder output value DYw2, and a second torque command signal value DYT2, by an equation of motion of the second dynamometer having the moment of inertia Jdy2 (see the following Equation (12)).

$$Jdy2 \cdot dDYw2/dt = SHT2 - DYT2 - DB\_Trq2 \quad (12)$$

The second tire speed calculation unit 621A obtains a tire driving torque value by subtracting the second vehicle driving torque value Fx2 and the second decelerating torque value DB_Trq2 from the second shaft torque meter detection value SHT2; and uses the tire driving torque value as an input to calculate the second tire speed value Vw2 by an equation of motion of the second tire shown in the following Equation (13).

$$SHT2 - DB\_Trq2 - Fx2 = Jt2 \cdot dVw2/dt \quad (13)$$

Next, test results of using an actual machine of the test system 1A of the second embodiment are described.

Figure 8:
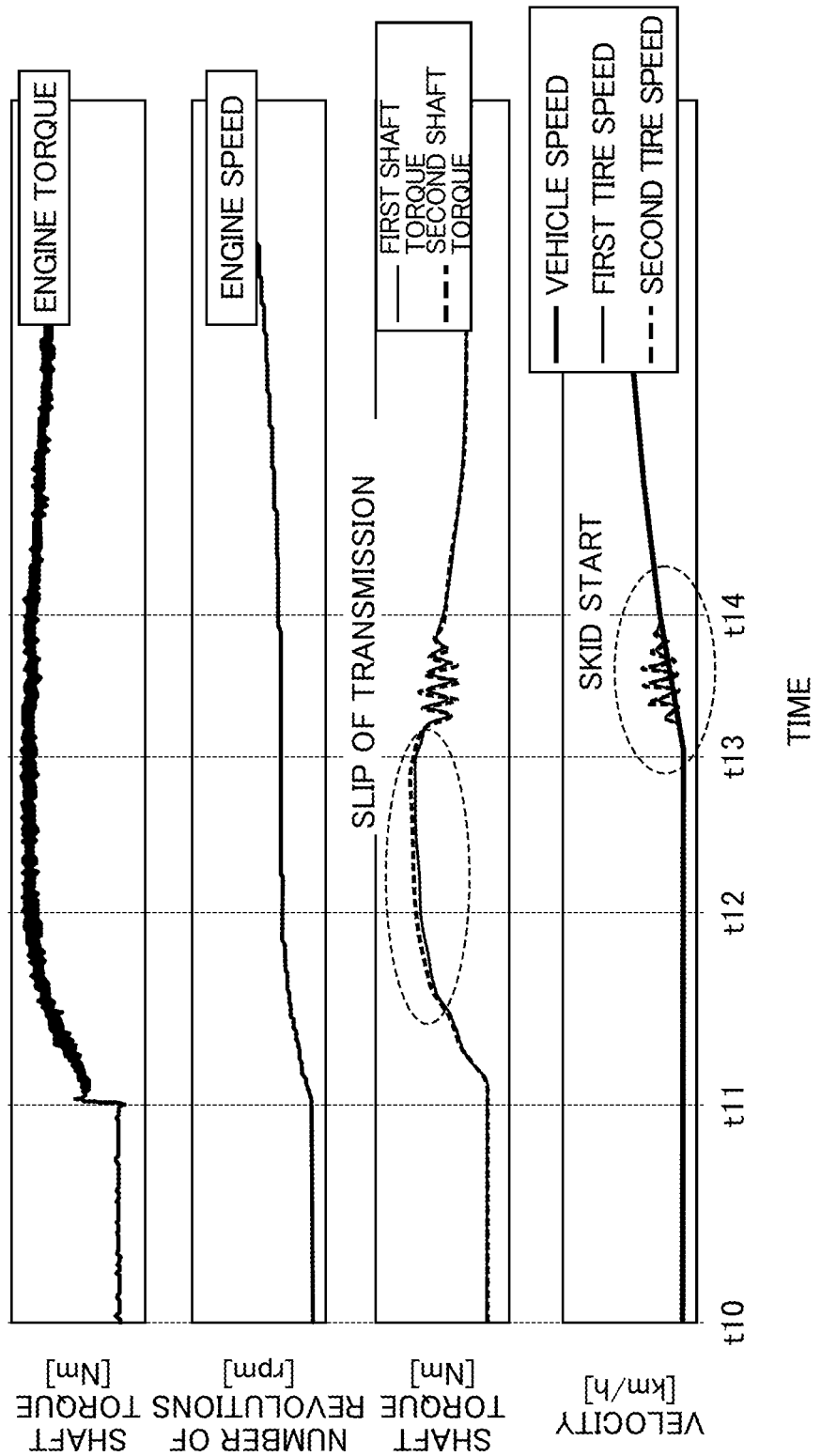
FIG. 8 is a diagram showing results of reproducing behavior of starting while skidding.

FIG. 8 is a diagram showing results of reproducing the starting while skidding. FIG. 8 shows the following in descending order from the upper part: engine torque (shaft torque between the engine E and the transmission T); a number of revolutions of the engine E; detection values of the shaft torque meters (the thin line corresponds to the first shaft torque meter, and the broken line corresponds to the second shaft torque meter); and calculated speed values (the bold solid line corresponds to the vehicle speed value V, the thin solid line corresponds to the first tire speed value Vw1, and the broken line corresponds to the second tire speed value Vw2). In the test shown in FIG. 8, a control map was used for the first and second road surfaces, such that the maximum value of the coefficient of friction between the tire and the road surface becomes approximately 0.8 in order to reproduce slightly wet road surface conditions.

During a period from time t10 to time t11, the engine E ran idle (the accelerator was OFF), the transmission was engaged in a drive range, and the two braking devices were ON. During this period, since the engine E ran idle, the first shaft torque and the second shaft torque underwent very little change.

At time t11, while maintaining the transmission in the drive range, the accelerator started to be pressed; and subsequently, around time t12, the accelerator position reached a fully-opened position. At this time, since the two braking devices were maintained ON, the vehicle speed and the speed of the two tires remained at 0, although the shaft torque acting on the output shaft of the transmission T rose. During this interval (from time t11 to t12), a slip was occurring in the transmission T, and a slight difference was confirmed in the output values from the two shaft torque meter (which is a stall test).

At time t13, while maintaining the accelerator position in the fully-opened position, and maintaining the transmission in the drive range, the two braking devices were turned off. As a result, the output shaft of the transmission T starts rotating, and the shaft torque of the output shaft decreases. By turning off the two braking devices, the dynamometer control circuit starts controlling the first and second dynamometers to reproduce sudden acceleration on a slightly wet road surface. As a result, as shown in FIG. 8, while the vehicle speed gently increases, the first and the second tire speeds show vibrational behavior, of which speed differs from the vehicle speed. At time t14, the two tires gripped on the road surface, and the tire speed equaled the vehicle speed. In this manner, the test system of the present embodiment reproduces the behavior of a vehicle accelerating from a stopped state, while alternately repeating the state of the tires slipping, and the state of the tires gripping on the road surface.

Figure 9:
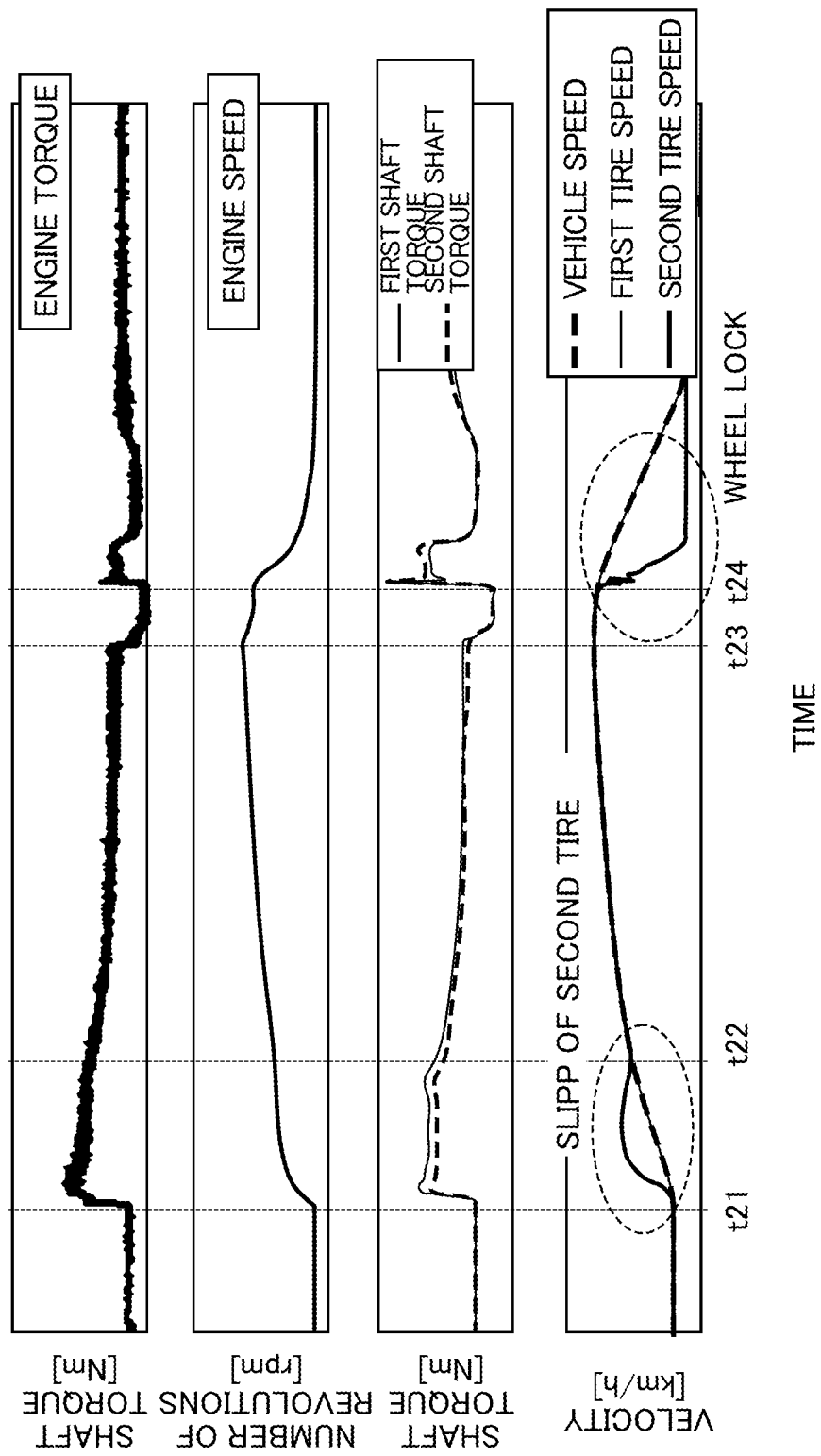
FIG. 9 is a diagram showing results of reproducing behavior from starting while slipping, to locking wheels.

FIG. 9 is a diagram showing results of reproducing behavior from starting while slipping, to locking the wheels. In the test shown in FIG. 9, a control map was used for the first road surface, such that the maximum value of the coefficient of friction between the tire and the road surface becomes approximately 1.0 in order to reproduce a dry road surface condition; and a control map was used for the second road surface, such that the maximum value of the coefficient of friction between the tire and the road surface becomes approximately 0.2 in order to reproduce a snowy road surface condition. In the test shown in FIG. 9, the two braking devices were OFF.

At time t21, while maintaining the transmission in the drive range, the accelerator position of the engine E was increased about 30%. The dynamometer control circuit independently controls the first and second dynamometers, respectively, such that the first dynamometer reproduces a dry pavement road, and the second dynamometer reproduces a snowy road. As a result, the first dynamometer reproduces a state where the first tire speed equals the vehicle speed, i.e. the first tire grips on the first road surface; and the second dynamometer reproduces a state where the second tire speed is higher than the vehicle speed, i.e. the second tire slips. From time t22, behavior was reproduced, in which the second tire stopped slipping, the speed of the two tires equaled the vehicle speed, and the two tires accelerated in a state of gripping on the road surface. In this manner, according to the dynamometer control circuit of the present test system, the road surface friction reproduction control and the vehicle inertia control are both realized.

At time t23, while maintaining the transmission in the drive range, the accelerator position of the engine E was changed to a fully-closed position. As a result, as shown in FIG. 9, the engine torque and the first and second shaft torque rapidly decreased.

Subsequently, at time t24, only the second braking device for reproducing the snowy road condition was turned on. As a result, the first tire speed decreases together with the vehicle speed, whereas only the second tire speed rapidly drops toward zero. That is to say, the present test system reproduces behavior of locking a wheel on a slippery road surface.

According to the test system of the present embodiment, the following effect (G) is achieved, in addition to the effects (A) to (F).

(G) In the present embodiment, the braking devices 71A and 72A for decelerating the rotation of the output shaft S1 of the transmission T are provided; the decelerating torque values DB_Trq1 and DB_Trq2 generated by operating the braking devices 71A and 72A are estimated on the basis of the shaft torque meter output values SHT1 and SHT2, the encoder output value DYw1 and DYw2, and the command signal values DYT1 and DYT2 for the inverter; the decelerating torque values DB_Trq1 and DB_Trq2 are subtracted from the shaft torque meter output values SHT1 and SHT2 generated by the braking devices; and a value obtained by the subtraction is defined as a tire driving torque value. As a result, behavior such as locking the wheels when operating the braking devices 71A and 72A can be reproduced; therefore, the test reproducibility can be further improved.

Third Embodiment

A drive-train test system 1B according to a third embodiment of the present invention is described with reference to the accompanying drawings.

Figure 10:
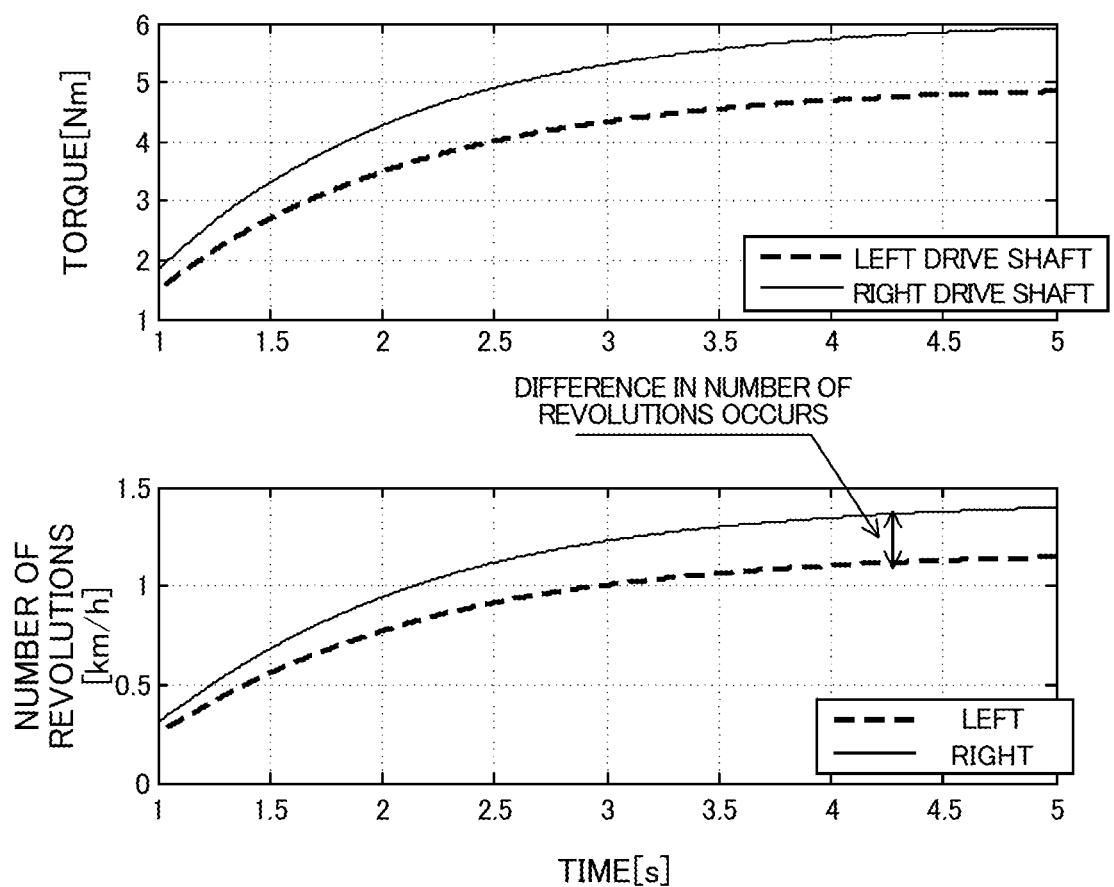
FIG. 10 is a diagram showing how detection values of first and second encoders change when a torque difference occurs in the test system of the first embodiment.

FIG. 10 is a diagram showing how the detection values of the first and second encoders (i.e. the number of revolutions of the right and left) change when a constant torque difference occurs between the first shaft torque SHT1 and the second shaft torque SHT2 (i.e. corresponding to the right and left drive shaft torque), in the test system 1 of the first embodiment. Behavior similar to that shown in FIG. 10 is also exhibited when a torque difference as described above occurs in the test system 1A of the second embodiment; therefore, illustrations thereof are omitted herein.

As shown in FIG. 10, in the first and the second embodiments, when a torque difference occurs in the right and left, a difference also occurs in the number of revolutions. A torque difference may also occur in the right and left wheels of an actual vehicle; however, in such a case, a driver operates the steering wheel or the like to equalize the number of revolutions of the right and left wheels, so as to drive the vehicle to go straight on. That is to say, in an actual vehicle, even if a torque difference occurs, a difference in the number of revolutions rarely occurs. Therefore, in this respect, the test systems of the first and second embodiments differ in behavior from an actual vehicle. The test system 1B of the third embodiment has been made in consideration of such a problem.

Figure 11:
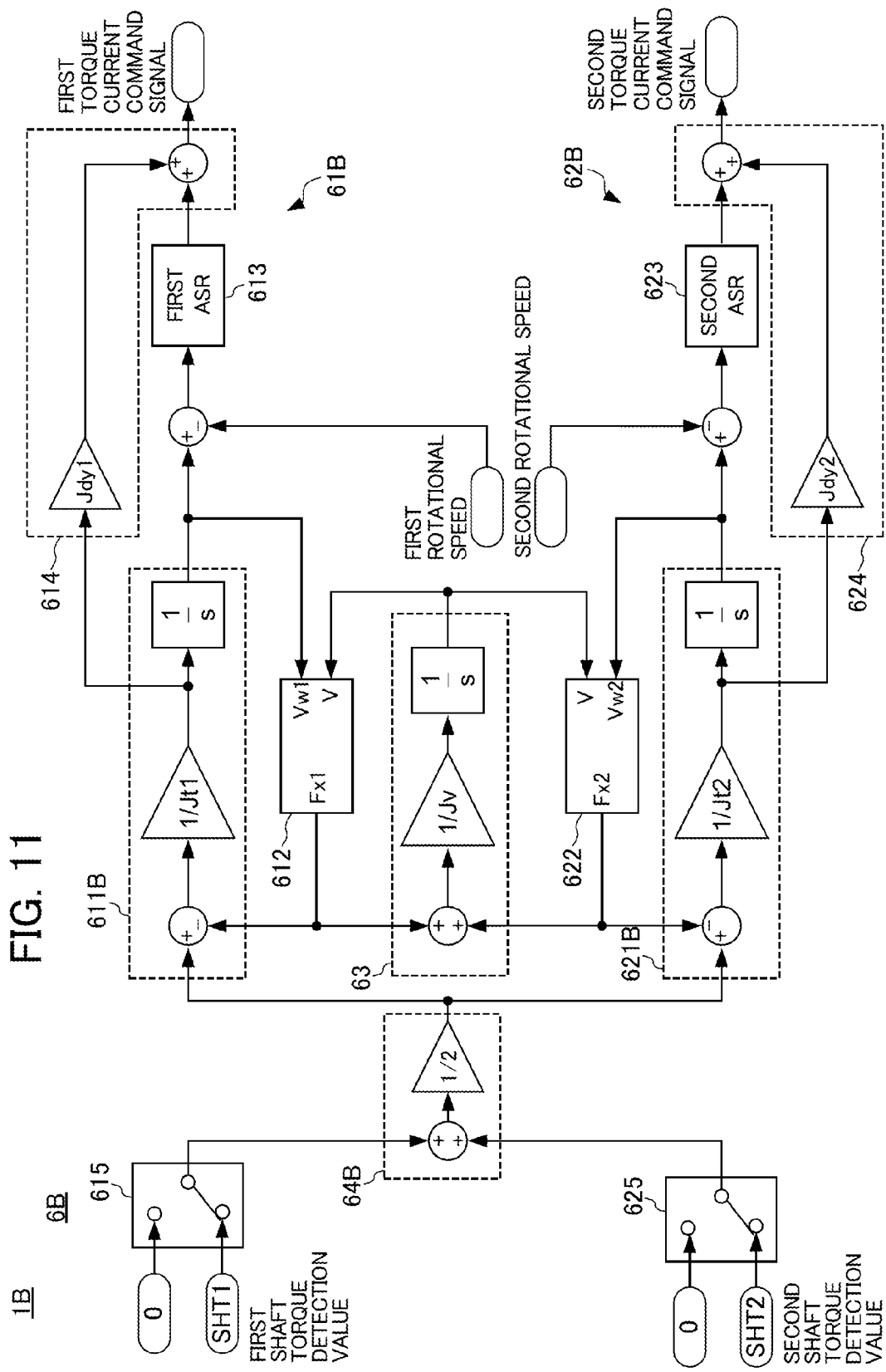
FIG. 11 is a block diagram showing a configuration of a dynamometer control circuit of a test system according to a third embodiment of the present invention.

FIG. 11 is a block diagram showing a configuration of a dynamometer control circuit 6B of the drive-train test system 1B according to the third embodiment. In the following descriptions of the test system 1B, the same configurations as those of the test system 1 of the first embodiment are assigned with the same reference numerals; and detailed descriptions thereof are omitted herein. The dynamometer control circuit 6B of the present embodiment is further provided with a shaft torque average value calculation unit 64B, which is different from the dynamometer control circuit 6 of FIG. 2; and configurations of a first tire speed calculation unit 611B of a first control circuit 61B, and a second tire speed calculation unit 621B of a second control circuit 62B, are also different.

The shaft torque average value calculation unit 64B calculates a shaft torque average value SHT_av by multiplying a sum of the first shaft torque meter detection value SHT1 and the second shaft torque meter detection value SHT2 by one-half.

The first tire speed calculation unit 611B calculates the first tire speed value Vw1 by: obtaining a value by subtracting the first vehicle driving torque value Fx1 from the shaft torque average value SHT_av; defining the obtained value as a first tire driving torque value contributing to the rotation of the first tire, which is then multiplied by the reciprocal number of the moment of inertia Jt1 of the first tire; and performing an integration operation thereon (see an equation of motion of the first tire shown in the following Equation (14)).

$$SHT\_av-Fx1=Jt1 \cdot dVw1/dt \qquad (14)$$

The second tire speed calculation unit 621B calculates the second tire speed value Vw1 by: obtaining a value by subtracting the second vehicle driving torque value Fx2 from the shaft torque average value SHT_av; defining the obtained value as a second tire driving torque value contributing to the rotation of the second tire, which is then multiplied by the reciprocal number of the moment of inertia Jt2 of the second tire; and performing an integration operation thereon (see an equation of motion of the second tire shown in the following Equation (15)).

$$SHT\_av-Fx2=Jt2 \cdot dVw2/dt \qquad (15)$$

Figure 12:
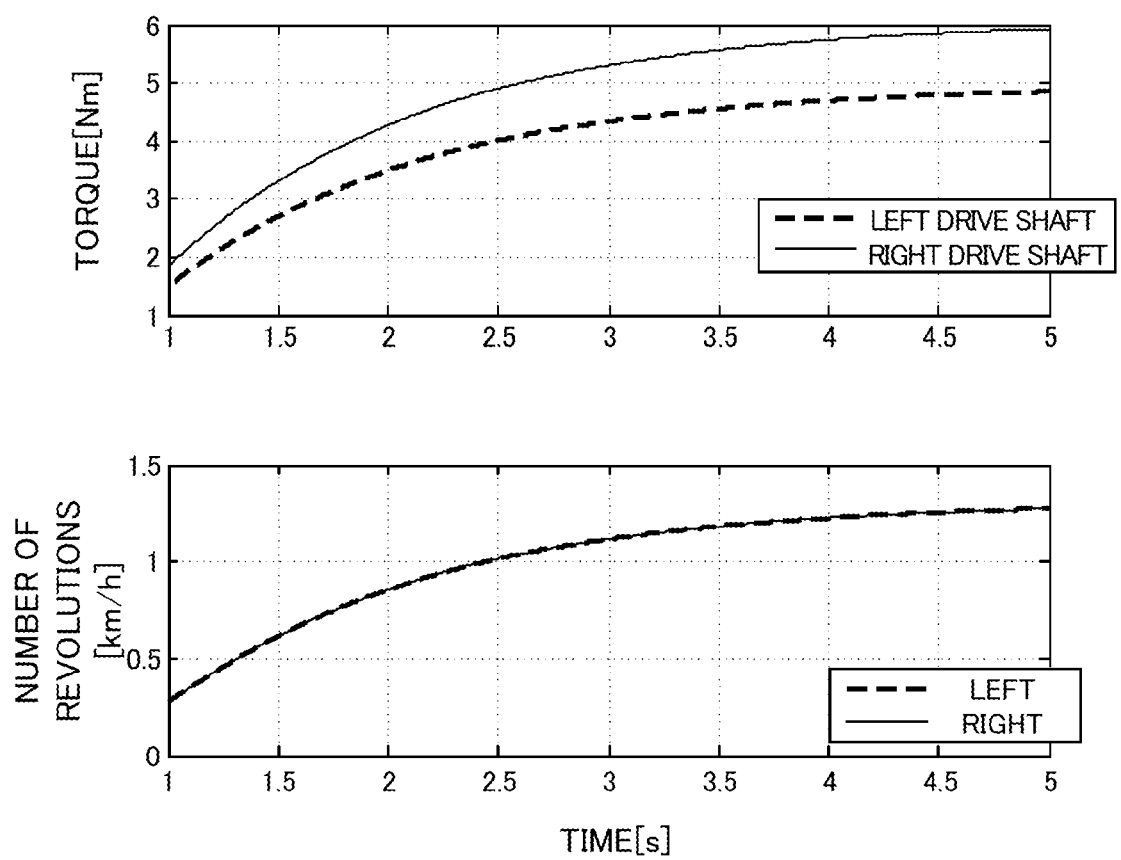
FIG. 12 is a diagram showing how detection values of first and second encoders change when a torque difference occurs in the test system of the above embodiment.

FIG. 12 is a diagram showing how the detection values of the first and second encoders change when a constant torque difference occurs between the first shaft torque SHT1 and the second shaft torque SHT2, in the test system 1B of the present embodiment. As is apparent from comparison of FIG. 12 with FIG. 10, according to the present embodiment, the shaft torque average value SHT_av, which is calculated by the shaft torque average value calculation unit 64B, is input into the first tire speed calculation unit 611B and the second tire speed calculation unit 621B; therefore, as a result, no difference occurs between the right and left in the number of revolutions. That is to say, the shaft torque average value calculation unit 64B has a function to artificially reproduce a driver's steering operation to control a vehicle to go straight on.

Fourth Embodiment

A drive-train test system 1C according to a fourth embodiment of the present invention is described with reference to the accompanying drawings.

Figure 13:
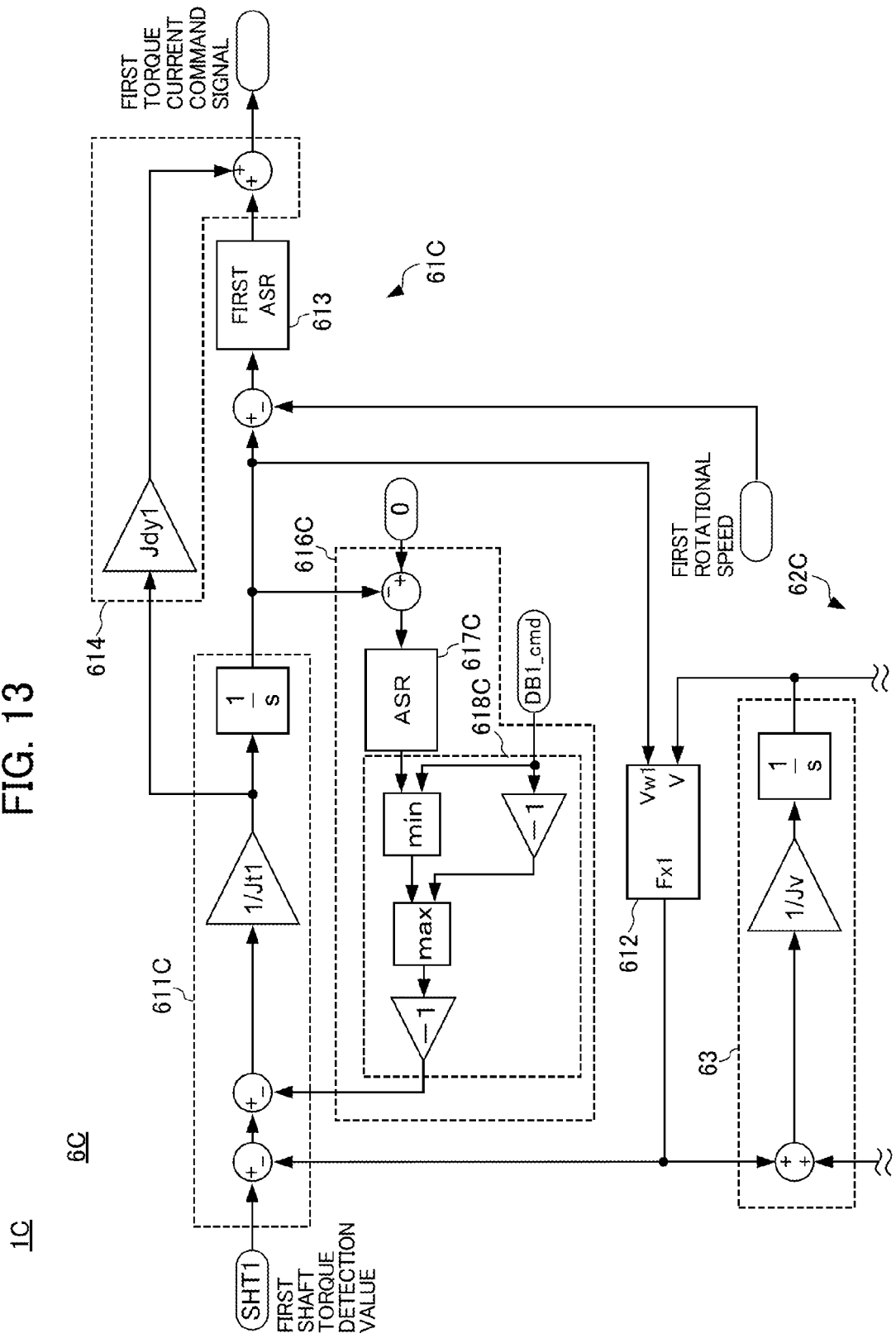
FIG. 13 is a block diagram showing a configuration of a dynamometer control circuit of a test system according to a fourth embodiment of the present invention.

FIG. 13 is a block diagram showing a configuration of a dynamometer control circuit 6C of a drive-train test system 1C according to the fourth embodiment. In the following descriptions of the test system 1C, the same configurations as those of the test system 1 of the first embodiment are assigned with the same reference numerals; and detailed descriptions thereof are omitted herein. The dynamometer control circuit 6C of the present embodiment is different, in a configuration of a first control circuit 61C and a second control circuit 62C, from the dynamometer control circuit 6 of FIG. 2. More specifically, the first control circuit 610 is further provided with a first braking torque calculation unit 616C, which is different from the dynamometer control circuit 6 of FIG. 2; and a configuration of a first tire speed calculation unit 611C is also different therefrom. Differences from the dynamometer control circuit 6 of FIG. 2 of the second control circuit 62C are the same as the differences from the dynamometer control circuit 6 of the first control circuit 61C; therefore, specific illustrations and detailed descriptions are omitted herein.

The first braking torque calculation unit 616C calculates a first braking torque value DB1, which is generated by operating a first virtual braking device provided to the first dynamometer 21 side of the output shaft S1 of the transmission as a test target (see FIG. 1).

The first braking torque calculation unit 616C is provided with a first brake speed control device (first break ASR) 617C and a braking torque limiter 618C, and calculates the first braking torque value DB1 in accordance with the following steps.

The first brake ASR 617C has the same function as the first speed control device 613, and calculates a braking torque value such that a deviation input value becomes 0 by subtracting the first tire speed value Vw1 from a predetermined stop target value (for example, 0).

When a first positive braking torque command value DB1_cmd, which serves as a command value for the braking torque that should be generated by the first virtual braking device, is input from an external input unit (not shown), the braking torque limiter 618C limits an output, which is proportional to the braking torque value of the first brake ASR 617C, within a range of a lower limit as −DB1_cmd to an upper limit as DB1_cmd. In a combination as shown in FIG. 13, when a deviation input is positive, an output from the first brake ASR 617C is negative; therefore, for convenience of calculation, the braking torque limiter 618C outputs the first braking torque value DB1 by multiplying the output value of the first brake ASR 617C, which is limited within the range of −DB1_cmd to DB1_cmd, by −1.

To summarize the above, the first braking torque calculation unit 616C uses the externally input first braking torque command value DB1_cmd as the upper limit, and calculates the first braking torque value DB1 of the first brake ASR 617C so as to be smaller than the upper limit, such that the first tire speed value Vw1 becomes the stop target value 0.

The first tire speed calculation unit 611C obtains a tire driving torque value by subtracting the first vehicle driving torque value Fx1 and the first braking torque value DB1, which is calculated by the first braking torque calculation unit 616C, from the first shaft torque meter detection value SHT1; and uses the tire driving torque value as an input to calculate the first tire speed value Vw1 by an equation of motion of the first tire shown in the following Equation (16).

$$SHT1-DB1-Fx1=Jt1 \cdot dVw1/dt \qquad (16)$$

Effects of the fourth embodiment are described with reference to FIGS. 14 and 15. In the fourth embodiment, even if a braking device is not provided to the transmission, the braking torque command value is increased or decreased, thereby making it possible to reproduce vehicle behavior for cases where the brake is operated strongly or weakly.

Figure 14:
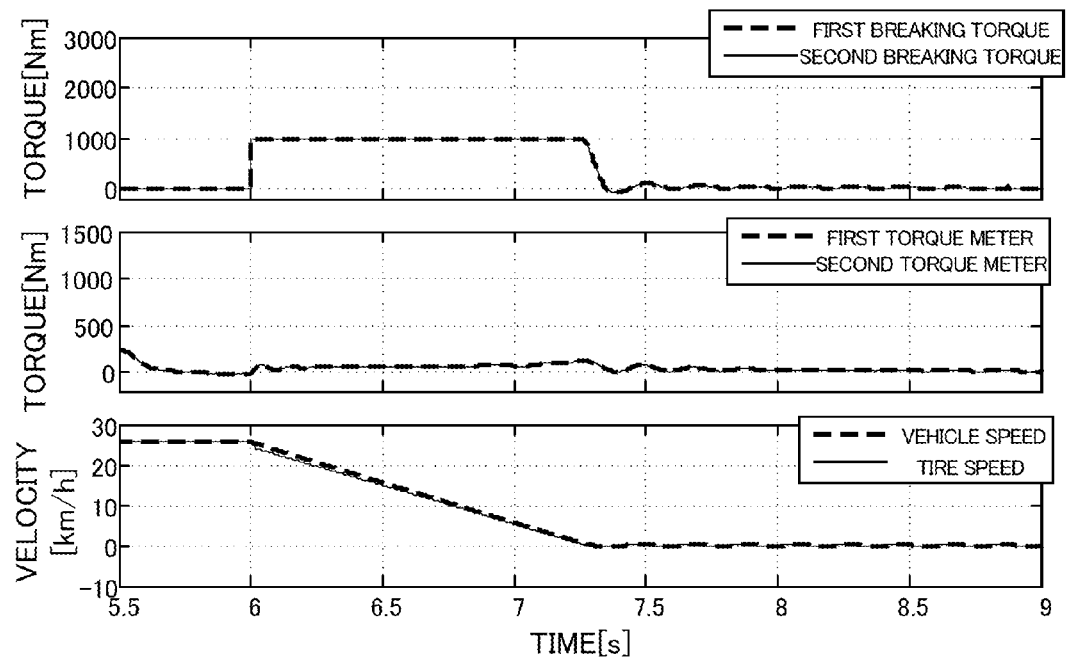
FIG. 14 is a diagram showing test results of the above embodiment to braking torque command value=1000 [Nm])
Figure 15:
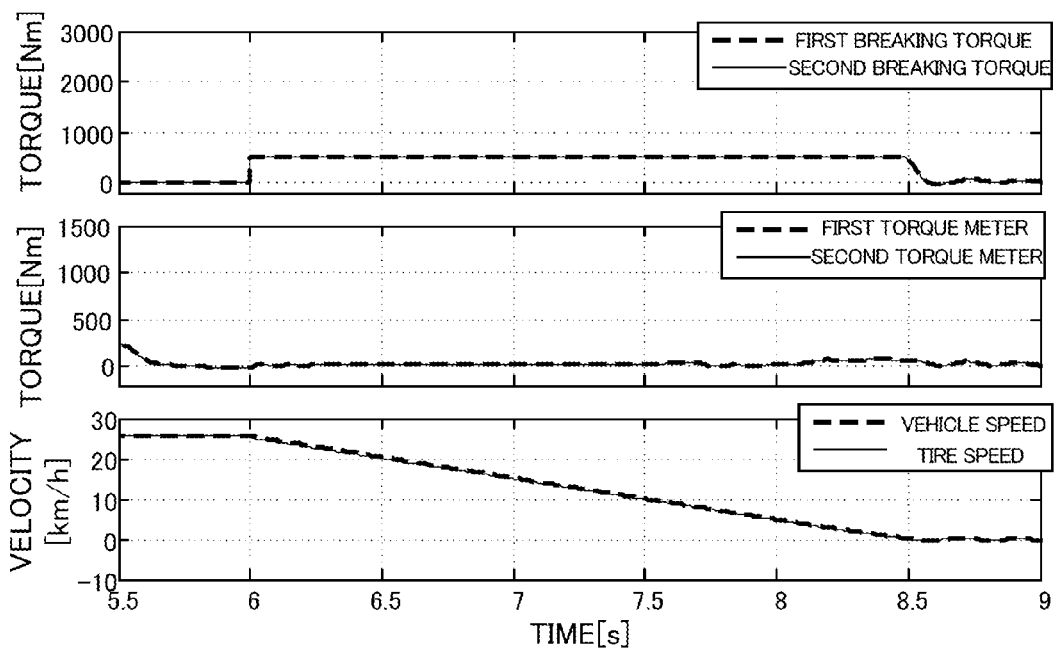
FIG. 15 is a diagram showing test results of the above embodiment (a braking torque command value=500 [Nm])

FIG. 14 is a diagram showing test results in a case in which the braking torque command value is set to 1000 [Nm], which is relatively strong; and FIG. 15 is a diagram showing test results in a case in which the braking torque command value is set to 500 [Nm], which is relatively weak. In FIGS. 14 and 15, the upper section shows the braking torque values calculated by the braking torque calculation unit; the middle section shows the shaft torque meter detection values; and the lower section shows the vehicle speed values calculated by the vehicle speed calculation unit, and the tire speed values calculated by the tire speed calculation unit. With regard to the tire speed values in the lower section, only the first tire speed values are illustrated, since the first tire speed values are identical to the second tire speed values. In the example shown in FIG. 14, the braking torque command value is set to 1000 [Nm] from time 6 [sec]; and in the example shown in FIG. 15, the braking torque command value is set to 500 [Nm] from time 6 [sec].

As shown in the upper sections of FIGS. 14 and 15, when the braking torque command value, which is not 0, is input at time 6 [sec], the braking torque calculation unit calculates a braking torque value by using the braking torque command value as the upper limit, such that the tire speed value becomes 0. In the example shown in FIG. 14, during a period from time 6 [sec] when the brake is turned on, to time 7.25 [sec] when the tire speed value reaches approximately 0, the braking torque calculation unit outputs the upper limit (1000 [Nm]) as the braking torque value. When the tire speed value approaches 0, the braking torque calculation unit outputs the braking torque values, which are equal to or less than the upper limit that is determined such that that the tire speed value becomes 0 by the function of the brake ASR. In the example shown in FIG. 15, during a period from time 6 [sec] when the brake is turned on, to time 8.5 [sec] when the tire speed value reaches approximately 0, the braking torque calculation unit outputs the upper limit (500 [Nm]) as the braking torque value. When the tire speed value approaches 0, the braking torque calculation unit outputs the braking torque values, which are equal to or less than the upper limit that is determined such that that the tire speed value becomes 0 by the function of the brake ASR. As a result, as shown in FIGS. 14 and 15, behavior can be reproduced from the time when the braking device is operated in a running state where the vehicle speed value is greater than 0, until the time when the vehicle speed value subsequently slows down to become 0. As is apparent from comparison of FIG. 14 with FIG. 15, when the braking torque command value is reduced, the time required until stopping the running vehicle is increased accordingly. Therefore, it was verified that, according to the present embodiment, intensity of the virtual braking device can be reproduced by increasing or reducing the braking torque command value.

Fifth Embodiment

A drive-train test system 1D according to a fifth embodiment of the present invention is described with reference to the accompanying drawings.

Figure 16:
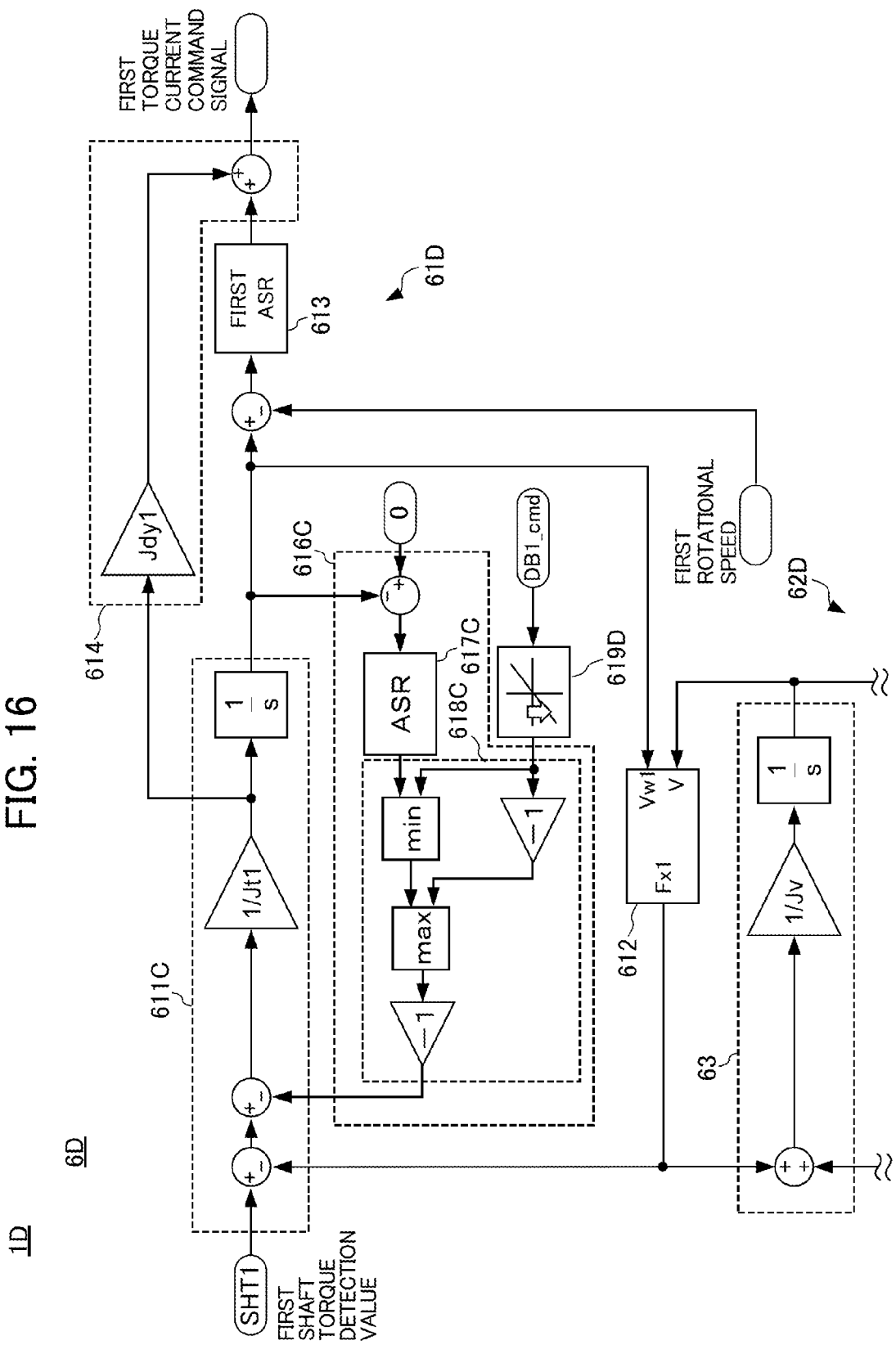
FIG. 16 is a block diagram showing a configuration of a dynamometer control circuit of a test system according to a fifth embodiment of the present invention.

FIG. 16 is a block diagram showing a configuration of a dynamometer control circuit 6D of the drive-train test system 1D according to the fifth embodiment. In the following descriptions of the test system 1D, the same configurations as those of the test system 1C of the fourth embodiment are assigned with the same reference numerals; and detailed descriptions thereof are omitted herein. The dynamometer control circuit 6D of the present embodiment is different, in a configuration of a first control circuit 61D and a second control circuit 62D, from the dynamometer control circuit 6C of FIG. 13. More specifically, the first control circuit 61D is further provided with a first rate-of-change limitation unit 619D, which is different from the dynamometer control circuit 6C of FIG. 13. Differences from the dynamometer control circuit 6C of FIG. 13 of the second control circuit 62D are the same as the differences from the dynamometer control circuit 6C of the first control circuit 61D; therefore, specific illustrations and detailed descriptions are omitted herein.

The first rate-of-change limitation unit 619D limits the first braking torque command value DB1_cmd, which is input from an external input unit, to or below a predetermined rate of change [Nm/sec]. That is to say, if the first braking torque command value DB1_cmd changes in a stepwise manner, it is changed in accordance with a predetermined rate of change [Nm/sec] or below. The rate of change in relation to the braking torque command value is hereinafter referred to as braking torque application speed [Nm/s]

The first braking torque calculation unit 616C uses a braking torque command value DB1_cmd_r, which is limited by the first rate-of-change limitation unit 619D, as the upper limit, and calculates the braking torque value DB1 so as to be smaller than the upper limit, such that the first tire speed value Vw1 becomes 0, similarly to the fourth embodiment.

Effects of the fifth embodiment are described with reference to FIGS. 17 and 18. In the fifth embodiment, even if a braking device is not provided to the transmission, the braking torque application speed is increased or reduced, thereby making it possible to reproduce vehicle behavior for cases where the brake is rapidly or slowly operated.

Figure 17:
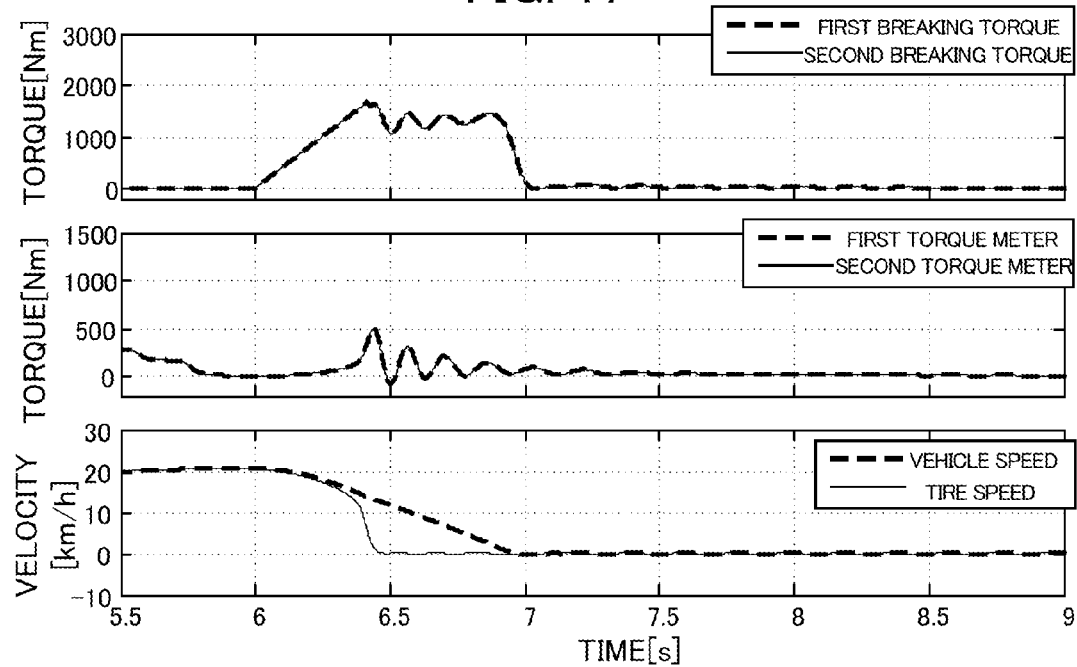
FIG. 17 is a diagram showing test results of the above embodiment (braking torque application speed=4000 [Nm/s])
Figure 18:
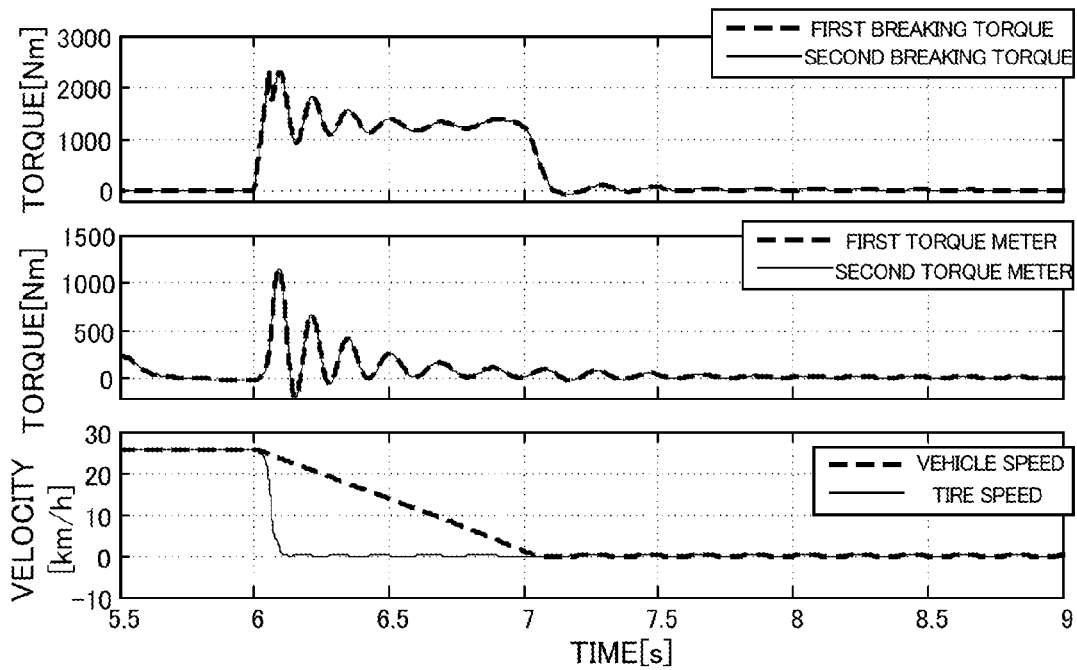
FIG. 18 is a diagram showing test results of the above embodiment (braking torque application speed=40000 [Nm/s]).

FIG. 17 is a diagram showing test results in a case in which the braking torque application speed is set to 4000 [Nm/s], which is relatively slow; and FIG. 18 is a diagram showing test results in a case in which the braking torque application speed is set to 40000 [Nm/s], which is relatively rapid. In the tests shown in FIGS. 17 and 18, the maximum value of the first and second coefficients of friction $\mu$ between the tire and the road surface was set to 1.2 (see FIG. 3).

As shown in FIG. 17, when the brake starts to be operated at time 6 [sec] at application speed of 4000 [Nm/s], the braking torque value calculated by the braking torque calculation unit subsequently gradually rises to 1700 [Nm] around time 6.3 [sec], when the tire is locked. That is to say, as shown in the lower section of FIG. 17, around time 6.3 [sec], the tire speed value decreases to 0 faster than the vehicle speed value decreases. This corresponds to a state where the vehicle slips and runs while the tire is locked.

On the other hand, as shown in FIG. 18, when the brake starts to be operated at time 6 [sec] at application speed of 40000 [Nm/s], the braking torque value calculated by the braking torque calculation unit rises more rapidly than in the example shown in FIG. 17, and rises to 2000 [Nm] around time 6.1 [sec], when the tire is locked. That is to say, when the braking torque application speed is increased, the tire is locked more quickly than in the example shown in FIG. 17. As is apparent from comparison of FIG. 17 with FIG. 18 in relation to the behavior after the locking, when the braking torque application speed is increased, vibration of the torque meter output value is increased, i.e. vibration to occur in the drive shaft is increased. Therefore, it was verified that, according to the present embodiment, rapidness or slowness of the virtual braking device can be reproduced by increasing or reducing the braking torque application speed.

The invention claimed is:

1. A drive-train test system, comprising:
a dynamometer connected to an output shaft of a workpiece;
an inverter for supplying electric power to the dynamometer in accordance with a command signal;
a shaft torque detector for detecting shaft torque acting on the output shaft; and
a velocity sensor for detecting rotational speed of the dynamometer;
the drive-train test system further comprising:
a tire speed calculation unit for calculating a tire speed value corresponding to rotational speed of a virtual tire connected to the output shaft of the workpiece;
a vehicle speed calculation unit for calculating a vehicle speed value corresponding to speed of a virtual vehicle running on the tire as a driving wheel;
a vehicle driving torque calculation unit for calculating a vehicle driving torque value generated by friction between the tire and a virtually set road surface, on the basis of a difference between the tire speed value and the vehicle speed value; and
a speed control device for using the tire speed value as a command value, and outputting a command signal so as to eliminate a deviation between the command value and an output value of the velocity sensor;
wherein the tire speed calculation unit obtains a tire driving torque value contributing to rotation of the tire by subtracting the vehicle driving torque value from an output value of the shaft torque detector, and calculates the tire speed value, on the basis of the tire driving torque value; and
wherein the vehicle speed calculation unit calculates the vehicle speed value, on the basis of the vehicle driving torque value.

2. The drive-train test system according to claim 1, further comprising:
a feedforward input calculation unit for combining a command signal, which is output from the speed control device, with a signal proportional to a difference between an output value of the shaft torque detector and the vehicle driving torque value, and correcting the command signal.

3. The drive-train test system according to claim 2,
wherein the tire speed calculation unit uses the tire driving torque value as an input, and calculates the tire speed value by an equation of motion of the tire characterized by a predetermined moment of inertia of tire; and
wherein the vehicle speed calculation unit uses the vehicle driving torque value as an input, and calculates the vehicle speed value by an equation of motion of the vehicle characterized by a predetermined moment of inertia of vehicle.

4. The drive-train test system according to claim 2, wherein the vehicle driving torque calculation unit calculates a slip ratio of the tire, on the basis of a speed difference between the tire speed value and the vehicle speed value; determines a friction coefficient value between the tire and the road surface, by using the slip ratio as an argument, on the basis of a control map selected in accordance with a road surface condition; and calculates the vehicle driving torque value by multiplying the friction coefficient value by a perpendicular force value that the tire receives from the road surface.

5. The drive-train test system according to claim 2, further comprising:
a braking torque calculation unit for calculating a braking torque value, which is generated by operating a virtual braking device provided to the output shaft of the workpiece;
wherein the tire speed calculation unit obtains a tire driving torque value contributing to rotation of the tire by subtracting the vehicle driving torque value and the braking torque value from an output value of the shaft torque detector, and calculates the tire speed value, on the basis of the tire driving torque value; and
wherein the braking torque calculation unit uses a predetermined braking torque command value as an upper limit, and calculates the braking torque value so as to be smaller than the upper limit, such that the tire speed value becomes 0.

6. The drive-train test system according to claim 5, further comprising:
a rate-of-change limitation unit for limiting the predetermined braking torque command value to or below a predetermined rate of change;
wherein the braking torque calculation unit uses the predetermined braking torque command value, which is limited by the rate-of-change limitation unit, as an upper limit, and calculates the braking torque value so as to be smaller than the upper limit, such that the tire speed value becomes 0.

7. The drive-train test system according to claim 2, further comprising:
a shaft torque input selector for selectively switching an input to the tire speed calculation unit, between an output value of the shaft torque detector and a value 0.

8. The drive-train test system according to claim 2, further comprising:
a braking device for decelerating rotation of the output shaft of the workpiece; and
a decelerating torque calculation unit for calculating a decelerating torque value of the output shaft, on the basis of an output value of the shaft torque detector, an output value of the velocity sensor, and a command signal value to the inverter;
wherein the tire speed calculation unit obtains the tire driving torque value by subtracting the vehicle driving torque value and the decelerating torque value from an output value of the shaft torque detector.

9. The drive-train test system according to claim 1,
wherein the tire speed calculation unit uses the tire driving torque value as an input, and calculates the tire speed value by an equation of motion of the tire characterized by a predetermined moment of inertia of tire; and
wherein the vehicle speed calculation unit uses the vehicle driving torque value as an input, and calculates the vehicle speed value by an equation of motion of the vehicle characterized by a predetermined moment of inertia of vehicle.

10. The drive-train test system according to claim 1, wherein the vehicle driving torque calculation unit calculates a slip ratio of the tire, on the basis of a speed difference between the tire speed value and the vehicle speed value; determines a friction coefficient value between the tire and the road surface, by using the slip ratio as an argument, on the basis of a control map selected in accordance with a road surface condition; and calculates the vehicle driving torque value by multiplying the friction coefficient value by a perpendicular force value that the tire receives from the road surface.

11. The drive-train test system according to claim 1, further comprising:

a braking torque calculation unit for calculating a braking torque value, which is generated by operating a virtual braking device provided to the output shaft of the workpiece;

wherein the tire speed calculation unit obtains a tire driving torque value contributing to rotation of the tire by subtracting the vehicle driving torque value and the braking torque value from an output value of the shaft torque detector, and calculates the tire speed value, on the basis of the tire driving torque value; and wherein the braking torque calculation unit uses a predetermined braking torque command value as an upper limit, and calculates the braking torque value so as to be smaller than the upper limit, such that the tire speed value becomes 0.

12. The drive-train test system according to claim 11, further comprising:

a rate-of-change limitation unit for limiting the predetermined braking torque command value to or below a predetermined rate of change;

wherein the braking torque calculation unit uses the predetermined braking torque command value, which is limited by the rate-of-change limitation unit, as an upper limit, and calculates the braking torque value so as to be smaller than the upper limit, such that the tire speed value becomes 0.

13. The drive-train test system according to claim 1, further comprising:

a shaft torque input selector for selectively switching an input to the tire speed calculation unit, between an output value of the shaft torque detector and a value 0.

14. The drive-train test system according to claim 1, further comprising:

a braking device for decelerating rotation of the output shaft of the workpiece; and a decelerating torque calculation unit for calculating a decelerating torque value of the output shaft, on the basis of an output value of the shaft torque detector, an output value of the velocity sensor, and a command signal value to the inverter;

wherein the tire speed calculation unit obtains the tire driving torque value by subtracting the vehicle driving torque value and the decelerating torque value from an output value of the shaft torque detector.

15. A drive-train test system, comprising:

a first dynamometer and a second dynamometer, which are connected to respective end sides of an output shaft of a workpiece;

a first inverter for supplying electric power to the first dynamometer in accordance with a first command signal, and a second inverter for supplying electric power to the second dynamometer in accordance with a second command signal;

a first shaft torque detector for detecting shaft torque acting on the first dynamometer side of the output shaft, and a second shaft torque detector for detecting shaft torque acting on the second dynamometer side of the output shaft; and a first velocity sensor for detecting rotational speed of the first dynamometer, and a second velocity sensor for detecting rotational speed of the second dynamometer;

the drive-train test system further comprising:

a first tire speed calculation unit for calculating a first tire speed value corresponding to rotational speed of a first virtual tire connected to the first dynamometer side of the output shaft, and a second tire speed calculation unit for calculating a second tire speed value corresponding to rotational speed of a second virtual tire connected to the second dynamometer side of the output shaft;

a vehicle speed calculation unit for calculating a vehicle speed value corresponding to speed of a virtual vehicle running on the first and second tires as driving wheels;

a first vehicle driving torque calculation unit for calculating a first vehicle driving torque value generated by a friction force between the first tire and a virtually set first road surface, on the basis of a difference between the first tire speed value and the vehicle speed value;

a second vehicle driving torque calculation unit for calculating a second vehicle driving torque value generated by a friction force between the second tire and a virtually set second road surface, on the basis of a difference between the second tire speed value and the vehicle speed value;

a first speed control device for using the first tire speed value as a first command value, and outputting a first command signal so as to eliminate a deviation between the first command value and an output value of the first velocity sensor; and a second speed control device for using the second tire speed value as a second command value, and outputting a second command signal so as to eliminate a deviation between the second command value and an output value of the second velocity sensor;

wherein the first tire speed calculation unit obtains a first tire driving torque value contributing to rotation of the first tire by subtracting the first vehicle driving torque value from an output value of the first shaft torque detector, or from an average value of output values of the first and second shaft torque detectors, and calculates the first tire speed value, on the basis of the first tire driving torque value;

wherein the second tire speed calculation unit obtains a second tire driving torque value contributing to rotation of the second tire by subtracting the second vehicle driving torque value from an output value of the second shaft torque detector, or from an average value of output values of the first and second shaft torque detectors, and calculates the second tire speed value, on the basis of the second tire driving torque value; and wherein the vehicle speed calculation unit calculates the vehicle speed value, on the basis of a total value of the first vehicle driving torque value and the second vehicle driving torque value.

16. The drive-train test system according to claim 15, wherein the first vehicle driving torque calculation unit calculates a first slip ratio of the first tire, on the basis of a speed difference between the first tire speed value and the vehicle speed value; determines a first friction coefficient value between the first tire and the first road surface, by using the first slip ratio as an argument, on the basis of a first control map selected in accordance with a first road surface condition; and calculates the first vehicle driving torque value by multiplying the first friction coefficient value by a first perpendicular force value that the first tire receives from the first road surface; and wherein the second vehicle driving torque calculation unit calculates a second slip ratio of the second tire, on the basis of a speed difference between the second tire speed value and the vehicle speed value; determines a second friction coefficient value between the second tire and the second road surface, by using the second slip ratio as an argument, on the basis of a second control map selected in accordance with a second road surface condition; and calculates the second vehicle driving torque value by multiplying the second friction coefficient value by a second perpendicular force value that the second tire receives from the second road surface.

\* \* \* \* \*